(12) United States Patent
Anthamatten

(10) Patent No.: US 12,286,508 B2
(45) Date of Patent: Apr. 29, 2025

(54) MELT-PROCESSABLE SHAPE-MEMORY ELASTOMERS CONTAINING BISUREA SEGMENTS

(71) Applicant: University of Rochester, Rochester, NY (US)

(72) Inventor: Mitchell Anthamatten, Rochester, NY (US)

(73) Assignee: University of Rochester, Rochester, NY (US)

( * ) Notice: Subject to any disclaimer, the term of this patent is extended or adjusted under 35 U.S.C. 154(b) by 494 days.

(21) Appl. No.: 17/679,806

(22) Filed: Feb. 24, 2022

(65) Prior Publication Data
US 2022/0340706 A1    Oct. 27, 2022

Related U.S. Application Data

(60) Provisional application No. 63/153,204, filed on Feb. 24, 2021.

(51) Int. Cl.
C08G 63/08    (2006.01)

(52) U.S. Cl.
CPC .................... C08G 63/08 (2013.01)

(58) Field of Classification Search
CPC ....................................... C08G 63/08
USPC .......................................... 528/34
See application file for complete search history.

(56) References Cited

PUBLICATIONS

Lee, H.; Yang, J. C.; Thoppey, N.; Anthamatten, M., Semicrystalline Shape-Memory Elastomers: Effects of Molecular Weight, Architecture, and Thermomechanical Path. Macromolecular Materials and Engineering 2017, 302 (12).
Lewis, C. L.; Meng, Y.; Anthamatten, M., Well-Defined Shape-Memory Networks with High Elastic Energy Capacity. Macromolecules 2015, 48 (14), 4918-4926.
Shi, Y.; Yoonessi, M.; Weiss, R. A., High Temperature Shape Memory Polymers. Macromolecules 2013, 46 (10), 4160-4167.
Wu, R. Q.; Lai, J. J.; Pan, Y.; Zheng, Z. H.; Ding, X. B., High-strain slide-ring shape-memory polycaprolactone-based polyurethane. Soft Matter 2018, 14 (22), 4558-4568.
Yang, P. F.; Zhu, G. M.; Shen, X. L.; Yan, X. G.; Nie, J., Poly(epsilon-caprolactone)-based shape memory polymers crosslinked by polyhedral oligomeric silsesquioxane. RSC Advances 2016, 6 (93), 90212-90219.

(Continued)

Primary Examiner — David T Karst
(74) Attorney, Agent, or Firm — Wissing Miller LLP

(57) ABSTRACT

A shape-memory polymer that is melt-recyclable with high processability and little performance loss, in contrast to known Crosslinked semicrystalline shape-memory networks that are capable of storing large amounts of elastic energy with negligible plastic deformation but as thermosets are not easily melt-processed or recycled. In examples herein, catalyst-free isocyanate chemistry is used to prepare two linear poly(caprolactone)s with bisurea hydrogen bonding groups periodically positioned along the main chain. Compared to an entangled poly(caprolactone) homopolymer of similar molecular weight, the segmented poly(bisurea)s exhibit minimal stress relaxation when elastically strained at identical conditions. Furthermore, the materials' single relaxation times indicate chain reptation, and at sufficient temperatures, disentanglement occurs rapidly enough to perform melt-processing. The polymers show excellent shape fixity and recovery before and after shredding, melt-pressing, and annealing into a reprocessed film.

6 Claims, 30 Drawing Sheets

(56) References Cited

PUBLICATIONS

Scheutz, G. M.; Lessard, J. J.; Sims, M. B.; Sumerlin, B. S., Adaptable Crosslinks in Polymeric Materials: Resolving the Intersection of Thermoplastics and Thermosets. Journal of the American Chemical Society 2019, 141 (41), 16181-16196.

Defize, T.; Riva, R.; Thomassin, J. M.; Alexandre, M.; Van Herck, N.; Du Prez, F.; Jerome, C., Reversible TAD Chemistry as a Convenient Tool for the Design of (Re) processable PCL-Based Shape-Memory Materials. Macromolecular Rapid Communications 2017, 38 (1).

Pratchayanan, D.; Yang, J. C.; Lewis, C. L.; Thoppey, N.; Anthamatten, M., Thermomechanical insight into the reconfiguration of Diels-Alder networks. Journal of Rheology 2017, 61 (6), 1359-1367.

Ding, Z. J.; Yuan, L.; Liang, G. Z.; Gu, A. J., Thermally resistant thermadapt shape memory crosslinked polymers based on silyl ether dynamic covalent linkages for self-folding and self-deployable smart 3D structures. Journal of Materials Chemistry A 2019, 7 (16), 9736-9747.

Chen, L. F.; Zhang, L. H.; Griffin, P. J.; Rowan, S. J., Impact of Dynamic Bond Concentration on the Viscoelastic and Mechanical Properties of Dynamic Poly(alkylurea-co-urethane) Networks. Macromolecular Chemistry and Physics 2020, 221 (1).

Fang, Z. Z.; Zheng, N.; Zhao, Q.; Xie, T., Healable, Reconfigurable, Reprocessable Thermoset Shape Memory Polymer with Highly Tunable Topological Rearrangement Kinetics. ACS Applied Materials & Interfaces 2017, 9 (27), 22077-22082.

Wang, Y. W.; Pan, Y.; Zheng, Z. H.; Ding, X. B., Reconfigurable and Reprocessable Thermoset Shape Memory Polymer with Synergetic Triple Dynamic Covalent Bonds. Macromolecular Rapid Communications 2018, 39 (10).

Mng, H. Z.; Zhang, Y. F.; Cheng, J. J., Dynamic urea bond for the design of reversible and self-healing polymers. Nature Communications 2014, 5.

Fortman, D. J.; Brutman, J. P.; Cramer, C. J.; Hillmyer, M. A.; Dichtel, W. R., Mechanically Activated, Catalyst-Free Polyhydroxyurethane Vitrimers. Journal of the American Chemical Society 2015, 137 (44), 14019-14022.

Anthamatten, M., Hydrogen Bonding in Supramolecular Polymer Networks: Glasses, Melts, and Elastomers. Supramolecular Polymer Networks and Gels 2015, 268, 47-99.

Lewis, C. L.; Dell, E. M., A review of shape memory polymers bearing reversible binding groups. Journal of Polymer Science Part B—Polymer Physics 2016, 54 (14), 1340-1364.

Thompson, C. B.; Korley, L. T. J., 100th Anniversary of Macromolecular Science Viewpoint: Engineering Supramolecular Materials for Responsive Applications—Design and Functionality. ACS Macro Letters, submitted 2020.

Isare, B.; Pensec, S.; Raynal, M.; Bouteiller, L., Bisurea-based supramolecular polymers: From structure to properties. Comptes Rendus Chimie 2016, 19 (1-2), 148-156.

Kikkawa, Y.; Kubota, S.; Karatsu, T.; Kitamura, A.; Kanesato, M.; Yagai, S., Two-Dimensional Organization of Mono- and Bisurea Supramolecular Polymers Studied by Scanning Tunneling Microscopy. Journal of Nanoscience and Nanotechnology 2010, 10 (2), 803-808.

Versteegen, R. M.; Kleppinger, R.; Sijbesma, R. P.; Meijer, E. W., Properties and morphology of segmented copoly (ether urea)s with uniform hard segments. Macromolecules 2006, 39 (2), 772-783.

Versteegen, R. M.; Sijbesma, R. P.; Meijer, E. W., Synthesis and characterization of segmented copoly(ether urea)s with uniform hard segments. Macromolecules 2005, 38 (8), 3176-3184.

Wisse, E.; Govaert, L. E.; Meijer, H. E. H.; Meijer, E. W., Unusual tuning of mechanical properties of thermoplastic elastomers using supramolecular fillers. Macromolecules 2006, 39 (21), 7425-7432.

Wisse, E.; Spiering, A. J. H.; Pfeifer, F.; Portale, G.; Siesler, H. W.; Meijer, E. W., Segmental Orientation in Well-Defined Thermoplastic Elastomers Containing Supramolecular Fillers. Macromolecules 2009, 42 (2), 524-530.

Botterhuis, N. E.; Karthikeyan, S.; Spiering, A. J. H.; Sijbesma, R. P., Self-Sorting of Guests and Hard Blocks in Bisurea-Based Thermoplastic Elastomers. Macromolecules 2010, 43 (2), 745-751.

Izuka, A.; Winter, H. H.; Hashimoto, T., Molecular-Weight Dependence of Viscoelasticity of Polycaprolactone Critical Gels. Macromolecules 1992, 25 (9), 2422-2428.

Jiang, S.; Shi, R. H.; Cheng, H. Y.; Zhang, C.; Zhao, F. Y., Synthesis of polyurea from 1,6-hexanediamine with $CO_2$ through a two-step polymerization. Green Energy Environ 2017, 2 (4), 370-376.

Yamamoto, T.; Shibayama, M.; Nomura, S., Structure and Properties of Fatigued Segmented Poly(Urethaneurea)S .3. Quantitative-Analyses of Hydrogen-Bond. Polym J 1989, 21 (11), 895-903.

Heinzmann, C.; Lamparth, I.; Rist, K.; Moszner, N.; Fiore, G. L.; Weder, C., Supramolecular Polymer Networks Made by Solvent-Free Copolymerization of a Liquid 2-Ureido-4[1H]-pyrimidinone Methacrylamide. Macromolecules 2015, 48 (22), 8128-8136.

Pattamaprom, C.; Wu, C. H.; Chen, P. H.; Huang, Y. L.; Ranganathan, P.; Rwei, S. P.; Chuan, F. S., Solvent-Free One-Shot Synthesis of Thermoplastic Polyurethane Based on Bio-Poly(1,3-propylene succinate) Glycol with Temperature-Sensitive Shape Memory Behavior. ACS Omega 2020, 5 (8), 4058-4066.

Rabani, G.; Luftmann, H.; Kraft, A., Synthesis and characterization of two shape-memory polymers containing short aramid hard segments and poly(epsilon-caprolactone) soft segments. Polymer 2006, 47 (12), 4251-4260.

Rabani, G.; Rosair, G. M.; Kraft, A., Low-temperature route to thermoplastic polyamide elastomers. Journal of Polymer Science Part a—Polymer Chemistry 2004, 42 (6), 1449-1460.

Yang, Y.; Davydovich, D.; Hornat, C. C.; Liu, X. L.; Urban, M. W., Leaf-Inspired Self-Healing Polymers. Chem 2018, 4 (8), 1928-1936.

Gu, X. Z.; Mather, P. T., Entanglement-based shape memory polyurethanes: Synthesis and characterization. Polymer 2012, 53 (25), 5924-5934.

Guo, Q. Y.; Bishop, C. J.; Meyer, R. A.; Wilson, D. R.; Olasov, L.; Schlesinger, D. E.; Mather, P. T.; Spicer, J. B.; Elisseeff, J. H.; Green, J. J., Entanglement-Based Thermoplastic Shape Memory Polymeric Particles with Photothermal Actuation for Biomedical Applications. ACS Applied Materials & Interfaces 2018, 10 (16), 13333-13341.

Petisco-Ferrero, S.; Fernandez, J.; San Martin, M. M. F.; Ibarburu, P. A. S.; Oiz, J. R. S., The relevance of molecular weight in the design of amorphous biodegradable polymers with optimized shape memory effect. Journal of the Mechanical Behavior of Biomedical Materials 2016, 61, 541-553.

Chinnappan, A.; Kim, H., Transition metal based ionic liquid (bulk and nanofiber composites) used as catalyst for reduction of aromatic nitro compounds under mild conditions. Rsc Adv 2013, 3 (10), 3399-3406.

Lyu, J. S.; Lee, J. S.; Han, J., Development of a biodegradable polycaprolactone film incorporated with an antimicrobial agent via an extrusion process. Sci Rep—Uk 2019, 9.

Keuleers, A.; Desseyn, H. O.; Rousseau, B.; Van Alsenoy, C., Vibrational analysis of urea. J Phys Chem A 1999, 103 (24), 4621-4630.

Inaloo, I. D.; Majnooni, S., A $Fe_3O_4$@$SiO_2$/Schiff Base/Pd Complex as an Efficient Heterogeneous and Recyclable Nanocatalyst for One-Pot Domino Synthesis of Carbamates and Unsymmetrical Ureas. Eur J Org Chem 2019, 2019 (37), 6359-6368.

Teo, L. S.; Chen, C. Y.; Kuo, J. F., Fourier transform infrared spectroscopy study on effects of temperature on hydrogen bonding in amine-containing polyurethanes and poly(urethane-urea)s. Macromolecules 1997, 30 (6), 1793-1799.

Doi, M., Soft Matter Physics. Oxford University Press: 2013.

FIG. 1
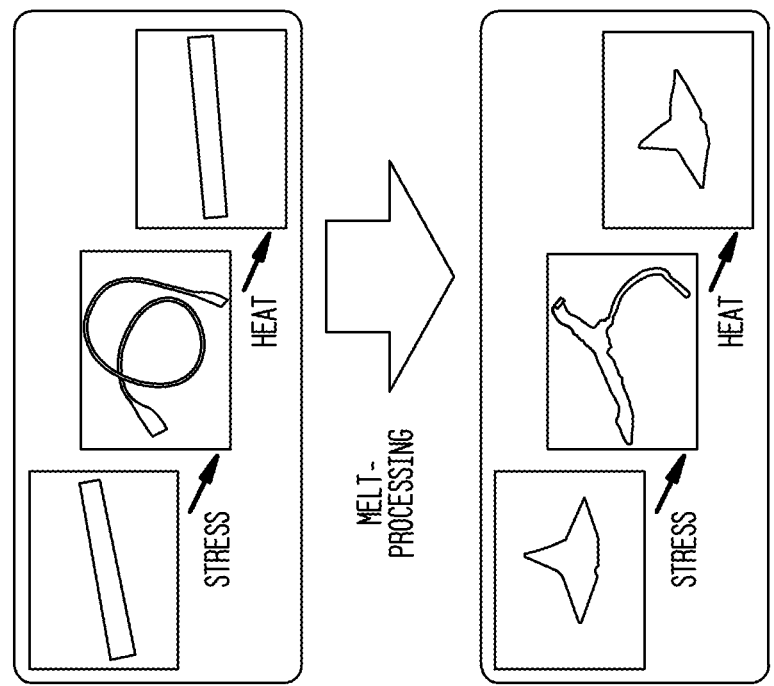
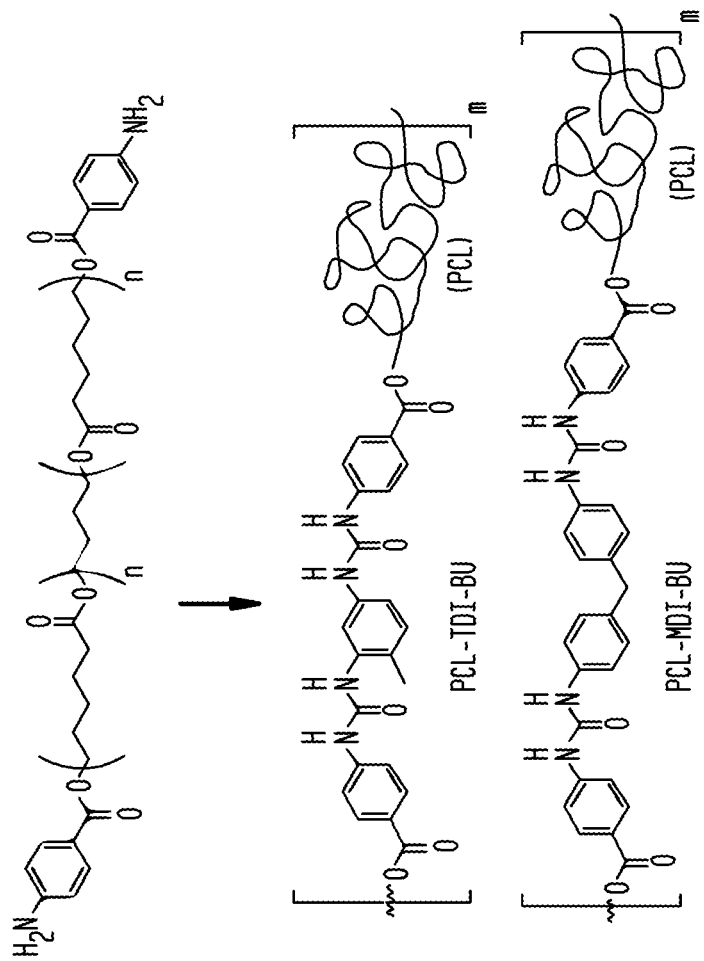

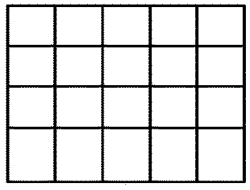
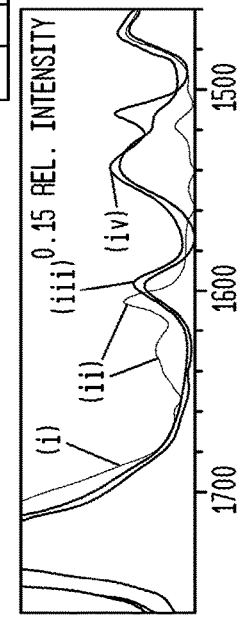
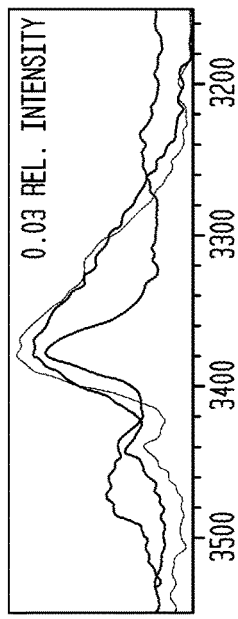
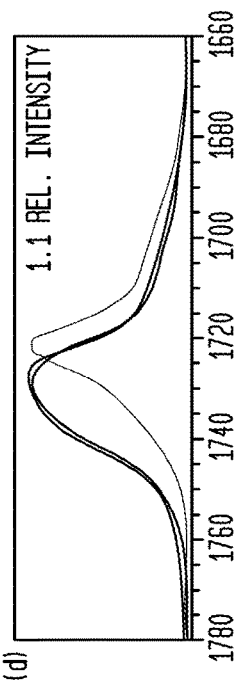
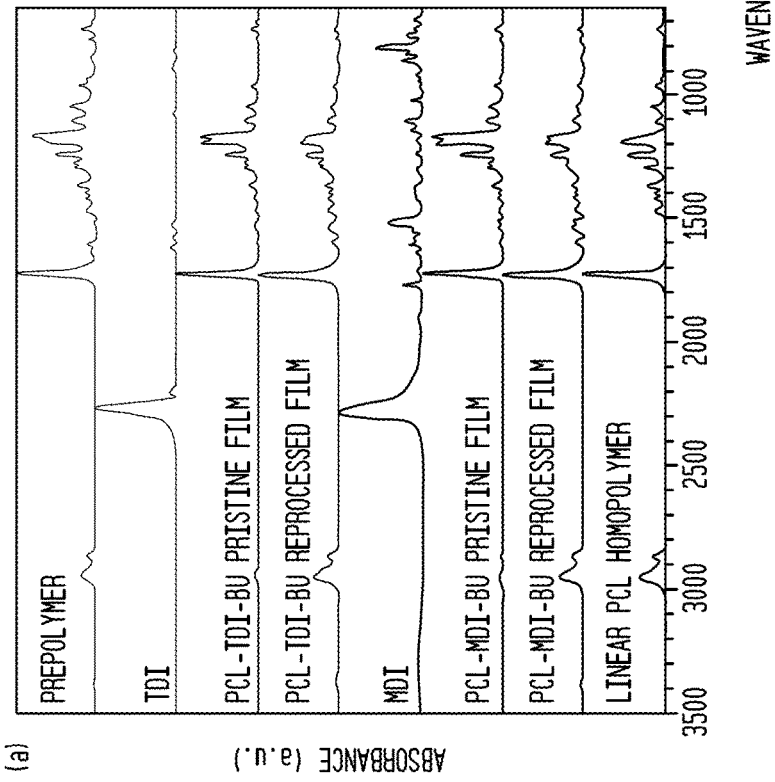

| SPECIMEN | $M_n$ (kg mol$^{-1}$) | $M_w$ (kg mol$^{-1}$) | PDI |
|---|---|---|---|
| PREPOLYMER | 3.0 | 3.7 | 1.2 |
| PCL-TDI-BU | 44 | 100 | 2.3 |
| PCL-MDI-BU | 76 | 290 | 3.8 |
| LINEAR PCL | 40 | 90 | 2.2 |

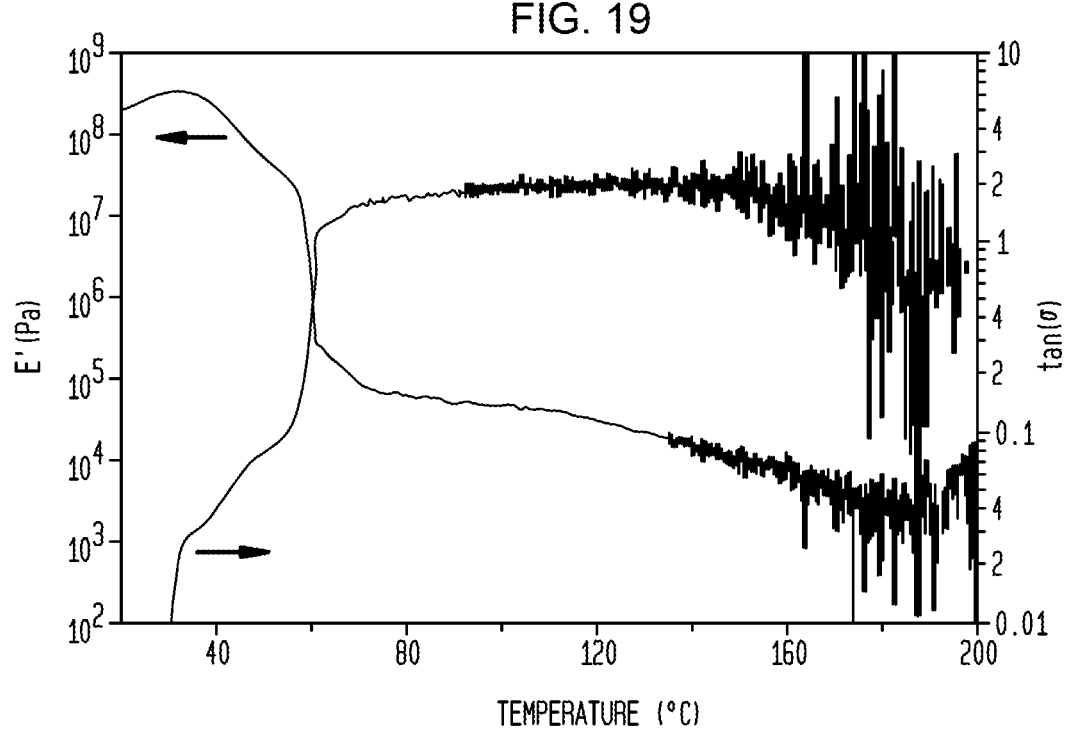

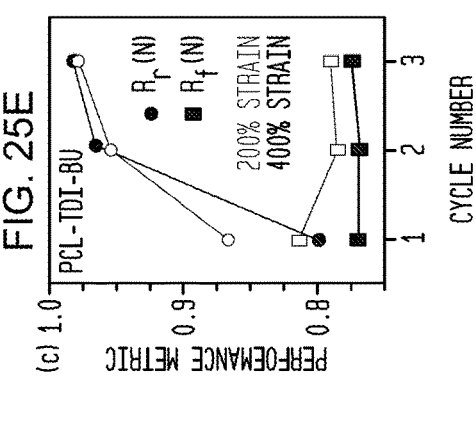
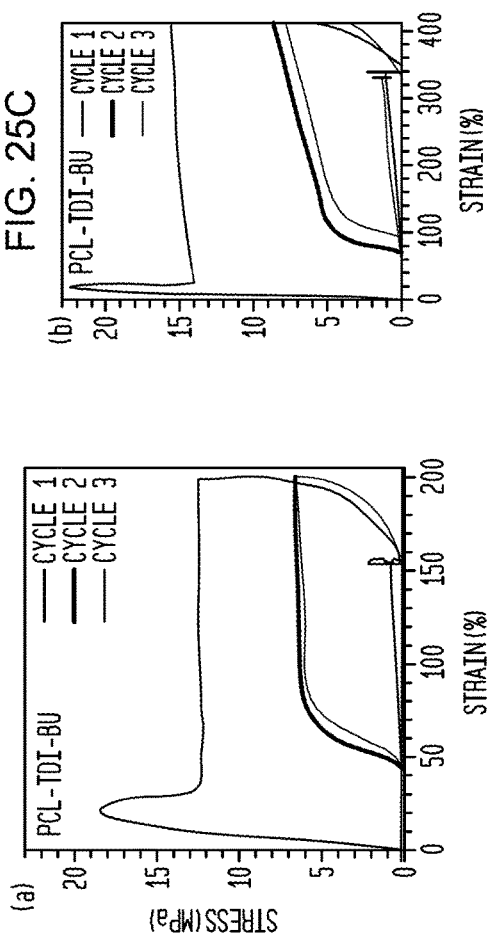
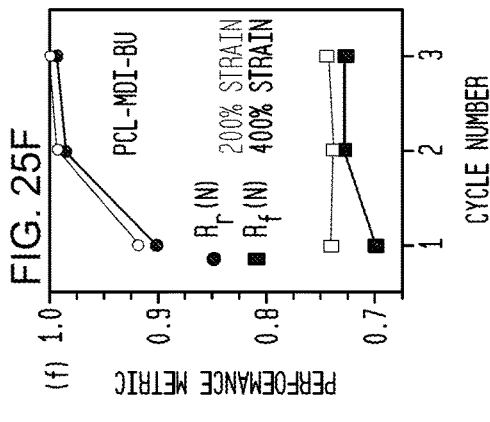
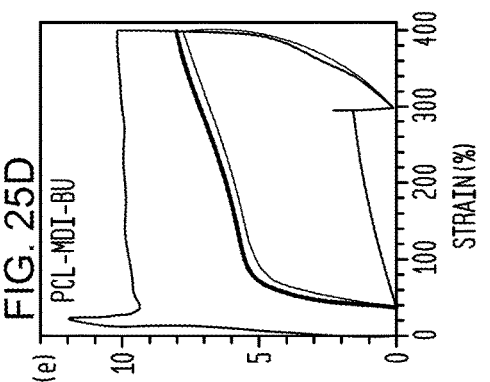
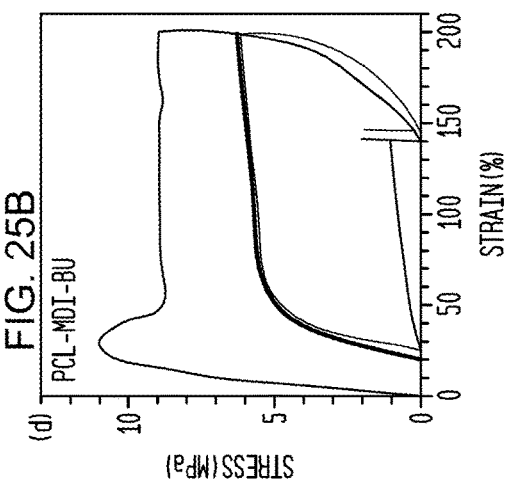

FIG. 26A

| PEAK STRAIN | PRISTINE FILMS | | | REPROCESSED FILMS | | |
|---|---|---|---|---|---|---|
| | CYCLE 1 | CYCLE 2 | CYCLE 3 | CYCLE 1 | CYCLE 2 | CYCLE 3 |
| 25% | 0.957 | 0.932 | — | 0.982 | 0.982 | — |
| 50% | 1.00 | 1.00 | — | 1.00 | 1.00 | 0.998 |
| 100% | 1.00 | 0.991 | — | — | — | — |
| 200% | 1.00 | 1.00 | 1.00 | — | — | — |

FIG. 26B

| PEAK STRAIN | PRISTINE FILMS | | | REPROCESSED FILMS | | |
|---|---|---|---|---|---|---|
| | CYCLE 1 | CYCLE 2 | CYCLE 3 | CYCLE 1 | CYCLE 2 | CYCLE 3 |
| 25% | 0.982 | 0.943 | — | 0.919 | 0.888 | — |
| 50% | 1.00 | 1.00 | — | 0.937 | 0.928 | 0.925 |
| 100% | 1.00 | 1.00 | — | — | — | — |
| 200% | 1.00 | 1.00 | 1.00 | — | — | — | ns
MELT-PROCESSABLE SHAPE-MEMORY ELASTOMERS CONTAINING BISUREA SEGMENTS

REFERENCE TO RELATED APPLICATIONS

This application claims priority to U.S. Provisional Patent Application Ser. No. 63/153,204 filed on Feb. 24, 2021 and incorporates by reference the contents thereof.

GOVERNMENT RIGHTS

This invention was made with government support under ECCS-1530540 and CHE-1725028 awarded by National Science Foundation and DE-FC52-08NA28302 awarded by Department of Energy. The government has certain rights in the invention.

FIELD

This patent specification relates to shape memory materials and more particularly to melt-processable memory shape elastomers and to methods of making such materials.

BACKGROUND AND SUMMARY OF THE DISCLOSURE

This patent specification cites references that are identified by superscript numbers in the text below and are fully cited at the end of the text. Each of the cited references is hereby incorporated by reference.

Semicrystalline shape-memory polymers (SSMPs) temporarily store elastic deformation by crystallization and, upon melting, return to their original shape. In contrast to thermoplastics, thermoset SSMPs are chemically cross-linked and exhibit nearly complete shape-recovery; however, they are not known be melt-processed.[1-5]

Dynamic covalent bonds have been integrated into shape-memory thermosets to overcome their processing limitations.[6] Recent examples include thermoreversible Diels-Alder and Alder-ene reactions,[7, 8] dynamic silyl ether linkages in epoxy based resins[9], hindered ureas[9-13], and stress activated transcarbamoylation.[14] While covalent bond reconfiguration of shape-memory networks is often praised for its convenience and simplicity, there are drawbacks. Reconfiguration often requires high temperatures where thermal degradation, undesirable crosslinking, or side-reactions with ambient moisture may interfere with the desired chemistry. Moreover, network reconfiguration is usually sluggish, even with catalysts, requiring minutes or even hours to complete, limiting polymer processing.

To combine high elastic energy storage and melt-processability into a single shape-memory elastic network, one may turn to non-covalent design elements such as chain entanglements, phase segregation, and strong hydrogen bonding.[15-17] Bisurea interactions are particularly appealing because they offer cooperative binding of four H-bonds and are easily formed by reacting amine-terminated prepolymers with small molecule diisocyanates. The structure of the bisurea linkage can be optimized for supramolecular self assembly[18, 19] or for hard segment formation within segmented copolymers.20-24

This patent specification describes thermoplastic poly(caprolactone)s that utilize bisurea segments to resist stress relaxation. Telechelic poly(caprolactone) prepolymers terminated with phenylamine groups are reacted with diisocyanates without catalysis to install bisurea groups periodically along the polymer backbone. The mechanism by which bisurea groups influences stress relaxation is discussed and has implications on shape training. The ability to melt-process SSMPs offers a competitive advantage for emerging applications in biomedical and textile spaces.

BRIEF DESCRIPTION OF THE DRAWINGS

FIG. 1 illustrates integration of bisurea segments into linear poly(caprolactones)s, and shape-memory cycles before and after melt reprocessing.

(FIG. 4E) time-resolved temperature, strain, and stress for the first pristine PCL-TDI-BU cycle at 100% strain; and (FIG. 4F) recrystallization.

(FIG. 5C) cumulative permanent creep strain, $\varepsilon_{cr}$; and (FIG. 5D) incremental change in cumulative creep per cycle, $\Delta\varepsilon_{cr}$.

FIGS. 15A-15D show ATR-FTIR spectra of reagents and products.

FIG. 19 shows DMA temperature sweep data for linear unfunctionalized PCL.

FIG.e 20 shows DSC scans of prepolymer and pristine poly(bisurea)s.

Figure 21A:
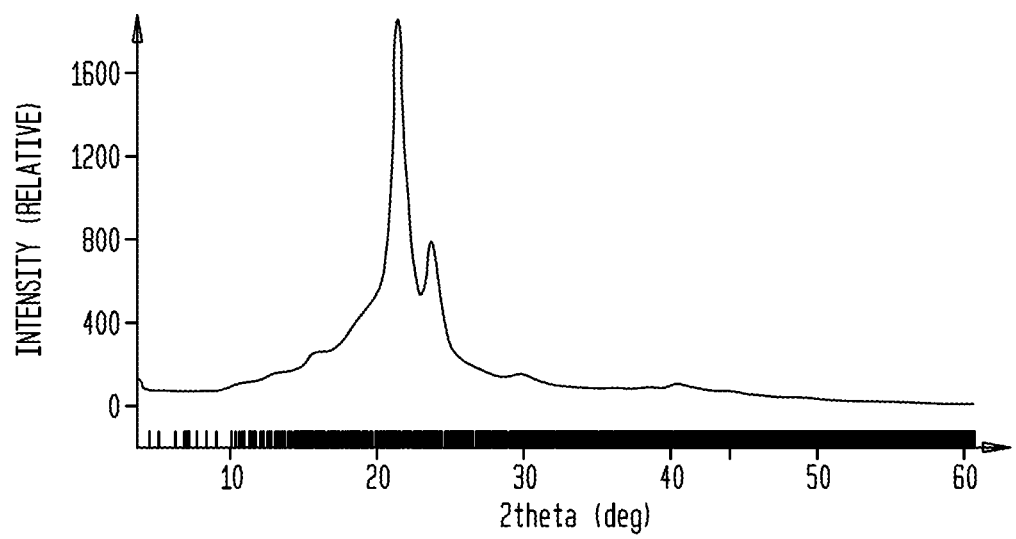

FIGS. 21A-19D show wide-angle X-ray scattering data.

Figure 22A:
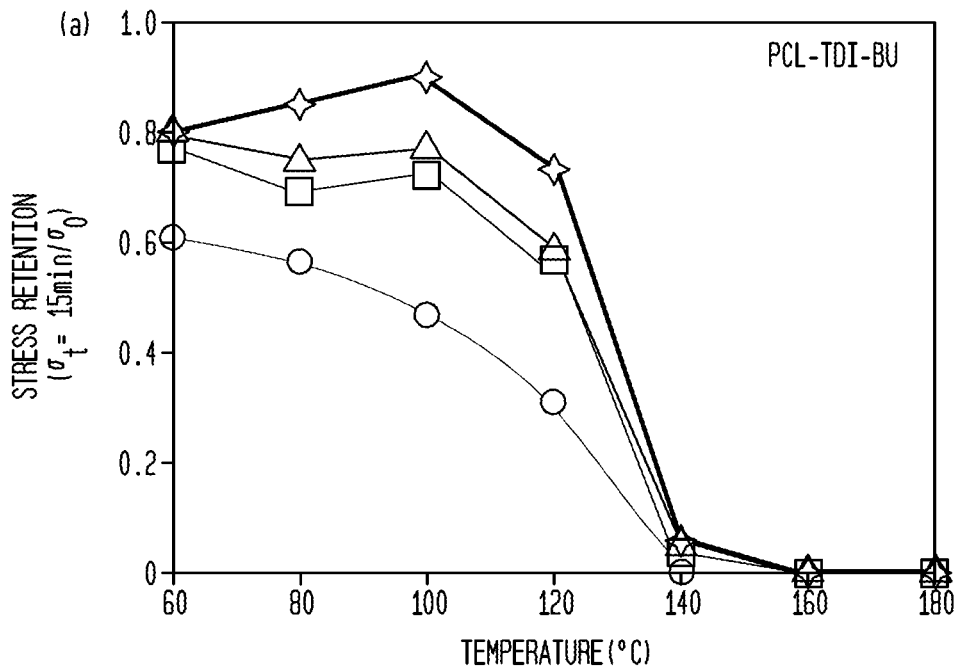
Figure 22B:
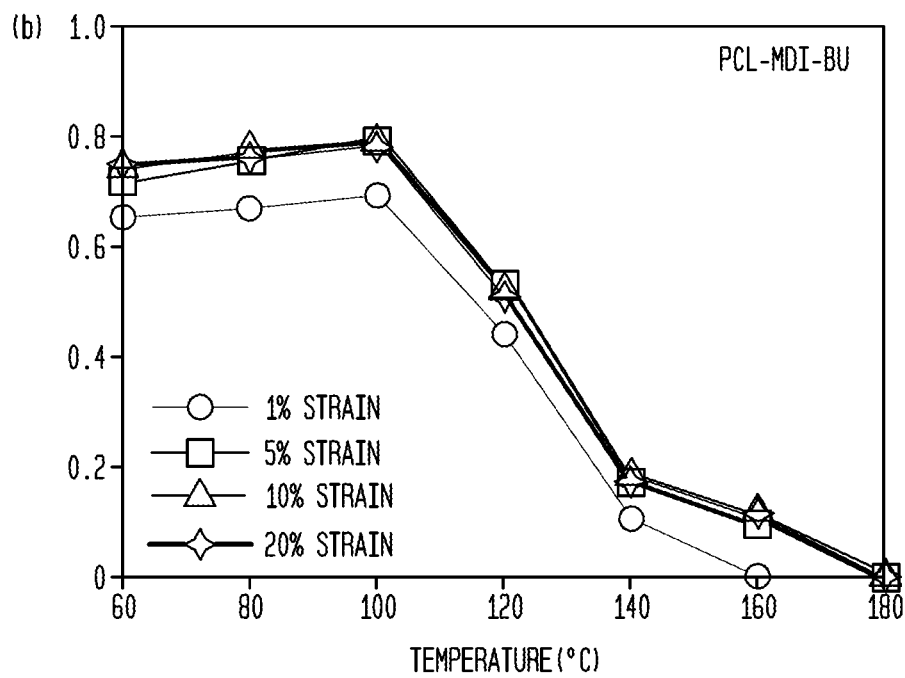

FIGS. 22A and 22B show stress retention by poly(bisurea)s in 15-min stress relaxation experiments.

Figure 23A:
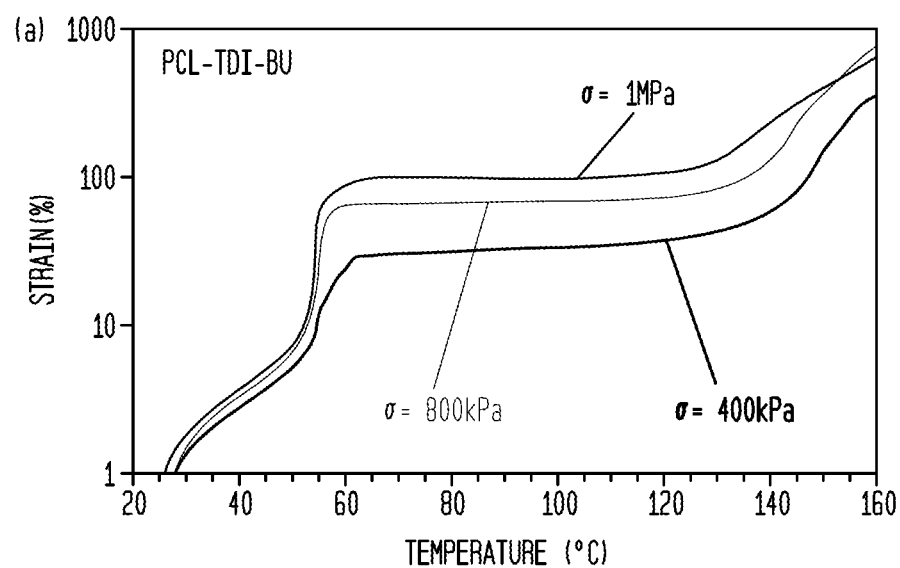
Figure 23B:
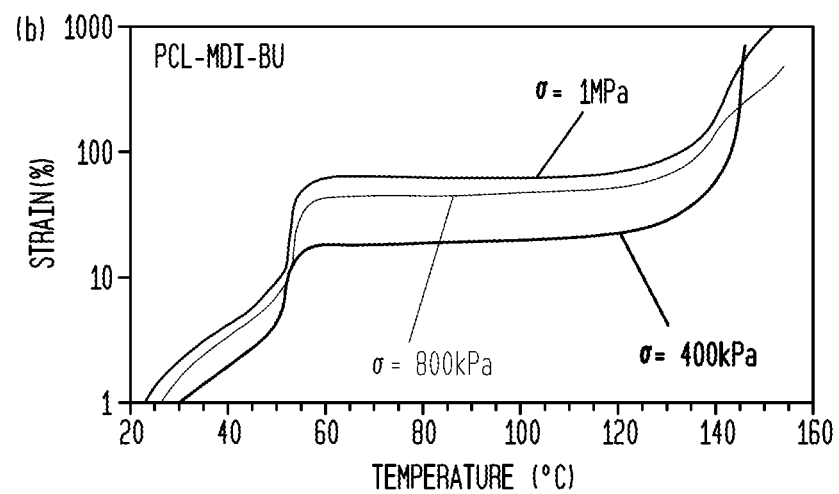

FIGS. 23A and 23B show tensile creep experiments for poly(bisurea) films.

Figure 24:
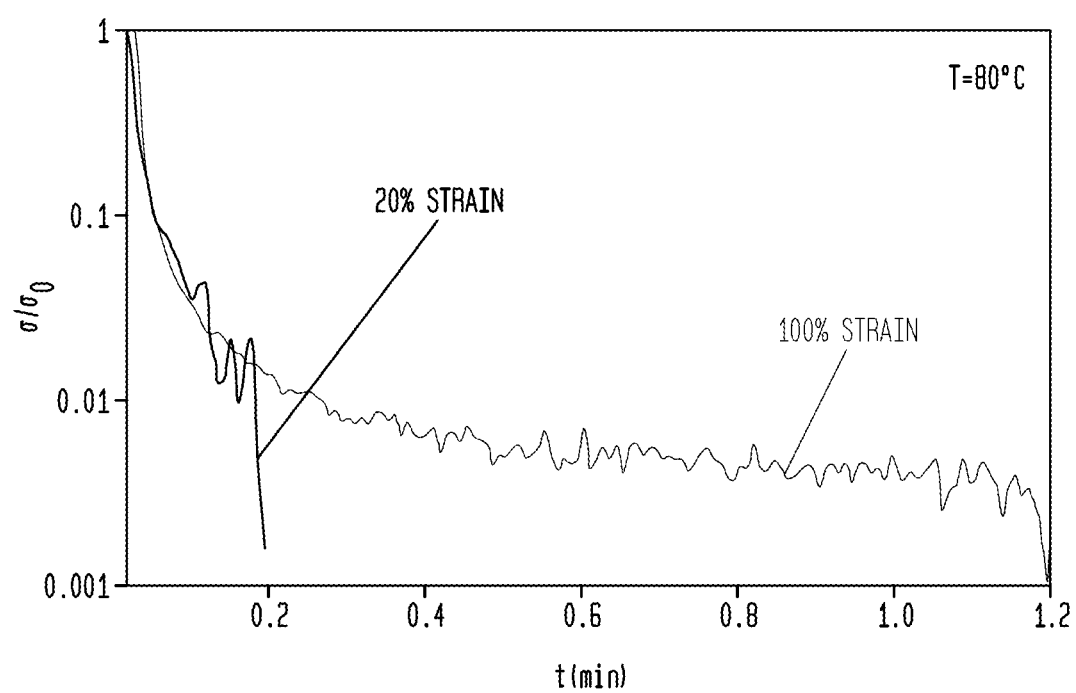

FIG. 24 shows stress relaxation curves for linear unfunctionalized PCL.

FIGS. 25A-25F show cold-draw shape-memory experiments.

FIGS. 26A and 26B show hot draw shape memory fixity ratios.

Figure 27A:
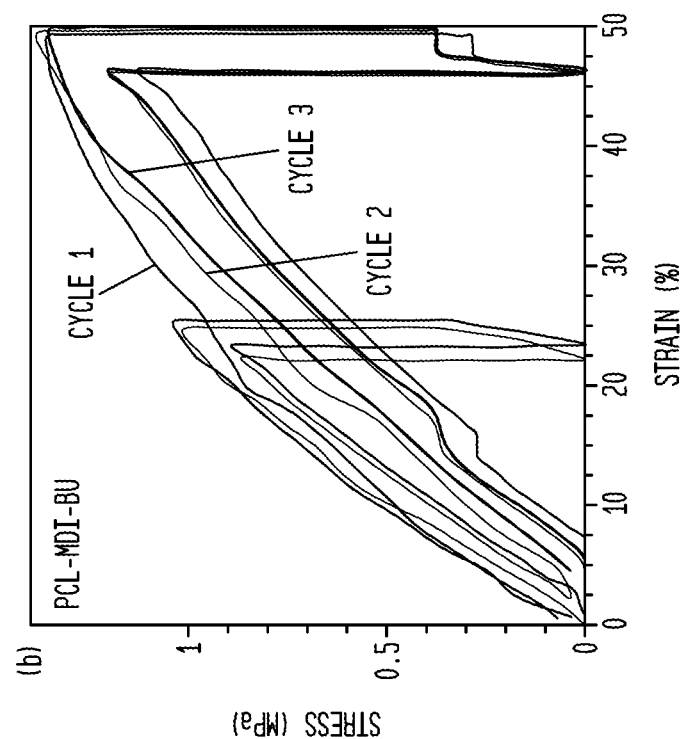
Figure 27B:
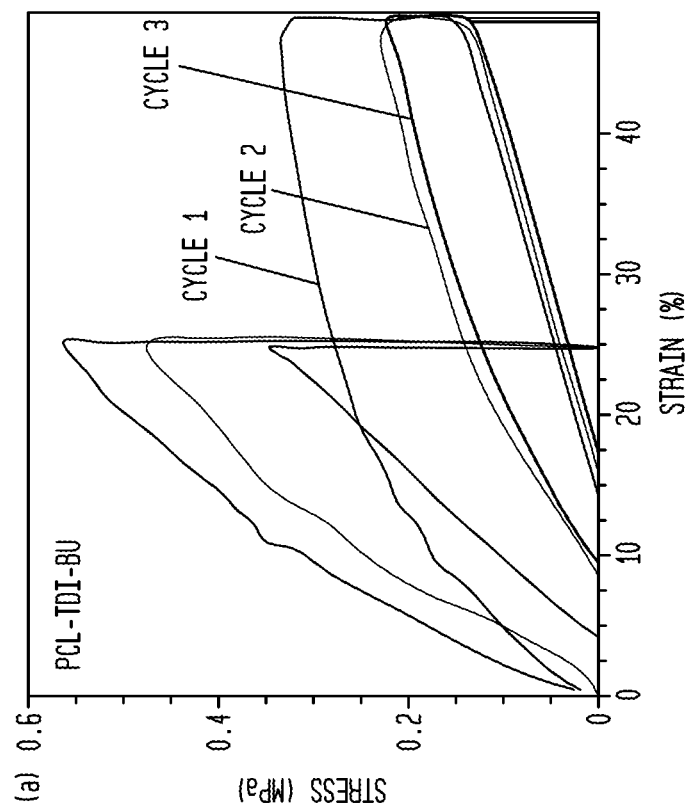
Figure 28A:
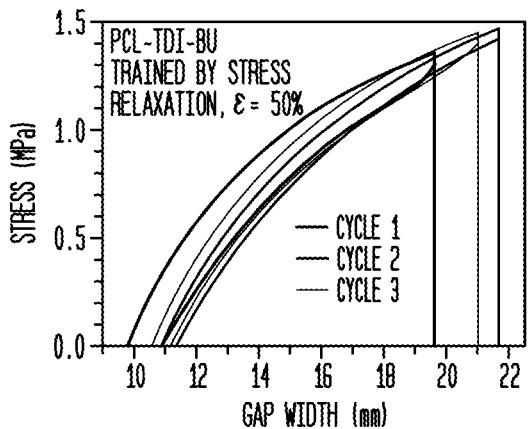
Figure 28D:
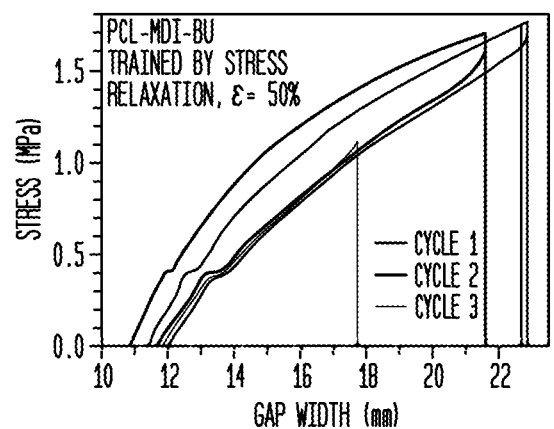
Figure 28B:
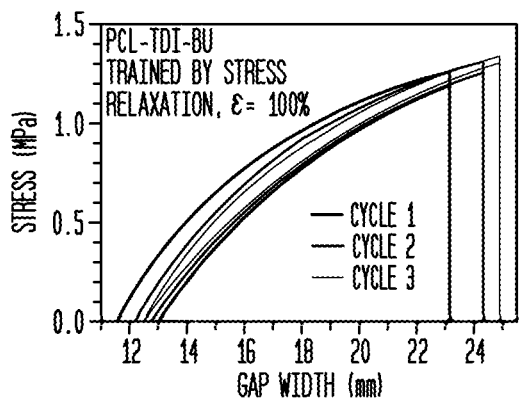
Figure 28E:
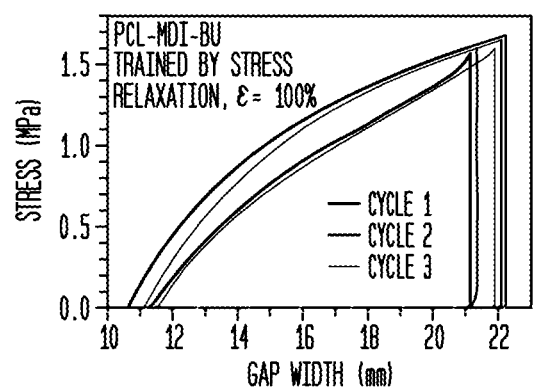
Figure 28C:
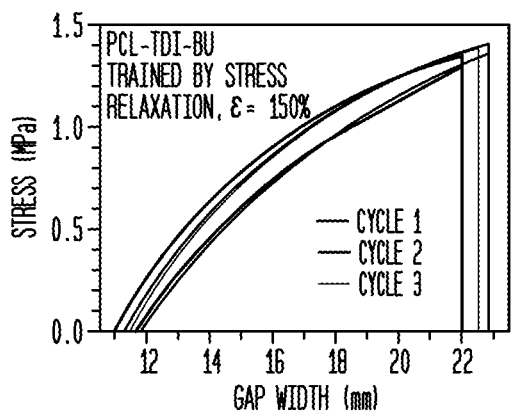
Figure 28F:
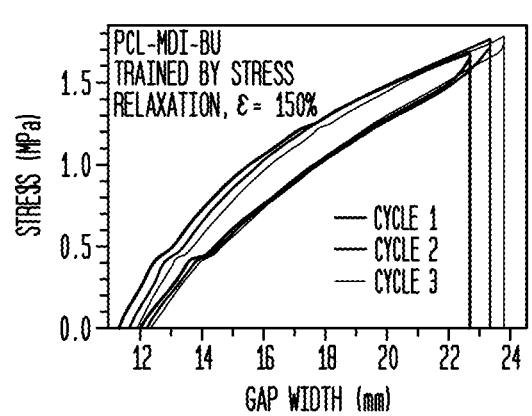

FIGS. 27A-27B show shape-memory cycles for reprocessed poly(bisurea) films.

FIGS. 28A-28F show shape-memory cycles for pre-trained poly(bisurea) films.

Figure 29A:
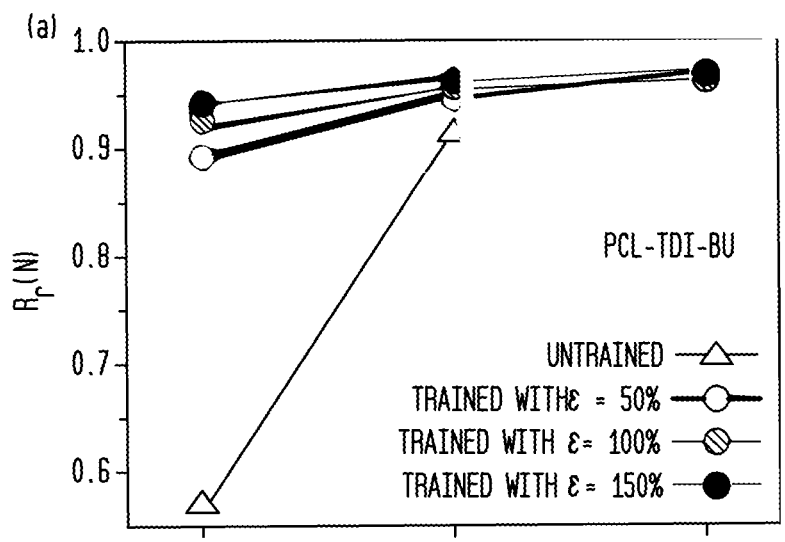
Figure 29B:
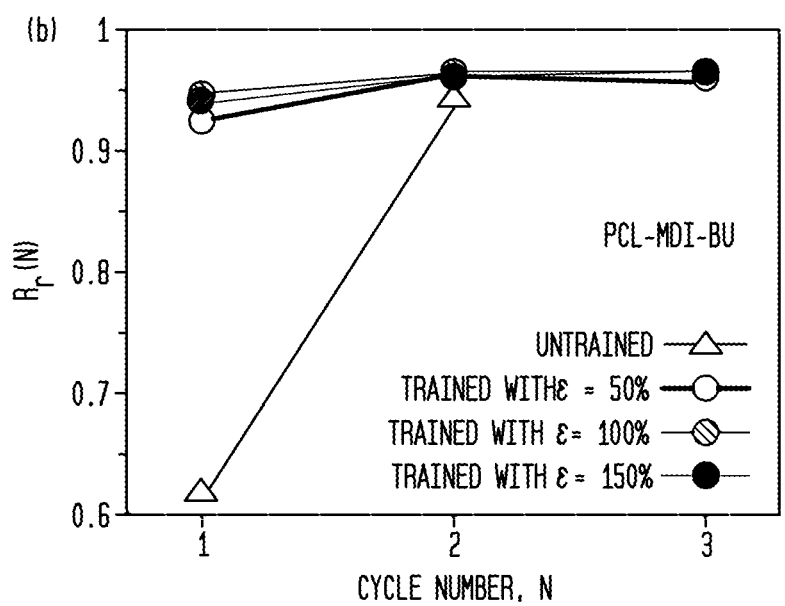

FIGS. 29A and 29B show shape recovery ratios of poly(bisurea) films with and without pre-training.

DETAILED DESCRIPTION

Design and Synthesis of Reprocessable Shape-Memory Segmented Polyureas. Telechelic poly(caprolactone)s with phenylamine end-groups where selected as prepolymers for condensation coupling with diisocyanates as shown in FIG. 1. The prepolymer molecular weight of 3,180 g mol−1 was chosen to ensure efficient crystallization of internal caprolactone segments during shape-memory cycling. This molecular weight is beneath poly(caprolactone)'s entanglement molecular weight of about 7-10 kDaltons. Commercially available toluene-2,4-diisocyanate (TDI) and 4,4'-methylenediphenyl diisocyanate (MDI) were employed as chain extenders as they were believed to offer the potential of bidentate hydrogen bonding between each formed urea linkage.

Chain extension of the telechelic prepolymer was performed in the bulk by hand-mixing the melted prepolymer with diisocyanate followed by curing for three days at 65° C. in a mold. This melt-mixing approach avoids the toxicity and volatility of aprotic solvents. The product bisurea (BU) polymers are designated as PCL-TDI-BU and PCL-MDI-BU to specify the backbone and linker diisocyanate. Reaction completion was verified through 1H-NMR (FIGS. 9-12), and ATR-FTIR of solid films showed the disappearance of the strong N=C=O stretch at 2270-2260 cm$^{-1}$ and the appearance of low-intensity IR absorption peaks at 1595 and 1538 cm$^{-1}$ upon formation of PCL-TDI-BU and PCL-MDI-BU films (FIGS. 15A-15D). These bands appear red-shifted with respect to the free urea C=O stretching and N—H bending vibrations respectively reported at 1690 and 1624 cm$^{-1}$, indicative of hydrogen bonding between the urea N—H donor and C=O acceptor groups on adjacent chains.[26, 27] See the Supporting Information infra. for detailed spectroscopic analysis.

Figure 17A:
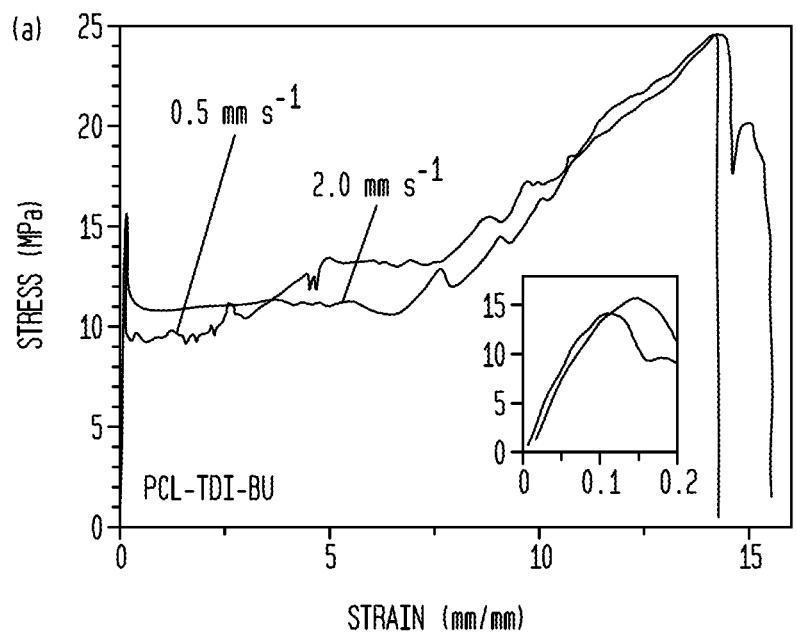
FIGS. 17A and 17B show results of strain-to-break experiments.
Figure 17B:
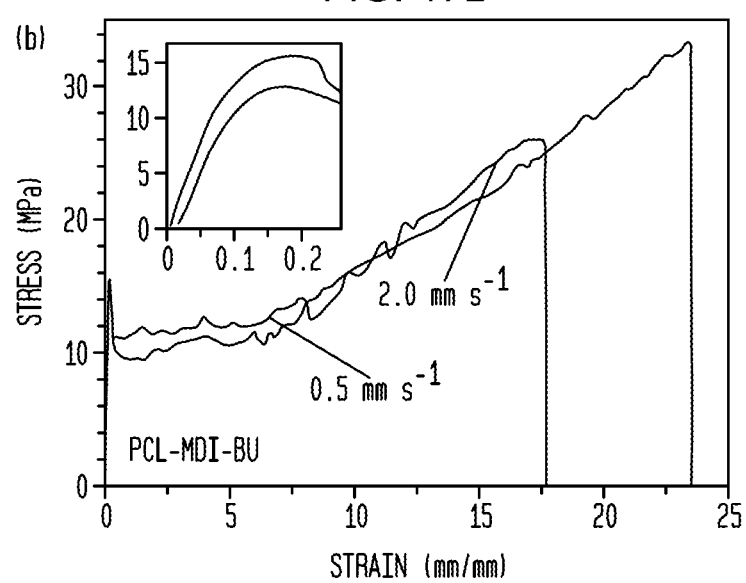

Table S1 is reproduced below and displays the product polymers' molecular weight characteristics along with a linear PCL homopolymer of similar molecular weight. The pristine, as-synthesized films were shredded into small pieces and melt-processed into films (see Experimental), and their resultant properties are also included in Table 1, denoted with asterisks. Pristine and reprocessed films show consistent strain-at-break exceeding 1000% strain (FIGS. 17A and 17B).

Table S1 below illustrates molecular weight characteristics and stiffness of segmented shape-memory elastomers containing bisurea linkages:

| Sample [a] | $M_n$ [b] (kg mol$^{-1}$) | $M_w/M_n$ [b] | $T_m$ [c] (° C.) | $E_c'$ [d] (MPa) | $E_r'$ [e] (MPa) |
|---|---|---|---|---|---|
| PCL-TDI-BU | 44 | 2.3 | 50 | 58 | 1.8 |
| PCL-TDI-BU* | — | — | 47 | 88 | 2.6 |
| PCL-MDI-BU | 76 | 3.8 | 46 | 58 | 5.0 |
| PCL-MDI-BU* | — | — | 44 | 54 | 3.0 |
| Linear PCL | 40 | 2.2 | 61 | 170 | 0.060 |

[a] An asterisk indicates the film was mechanically shredded and melt-processed.
[b] Determined by GPC based on poly(caprolactone) standards.
[c] Determined by the temperature at which (d log(E')/dT) exhibits a maximum.
[d] Determined by dynamic mechanical analysis at 20° C. below the melting temperature.
[e] Determined by dynamic mechanical analysis at 20° C. above the melting temperature.

Figure 2A:
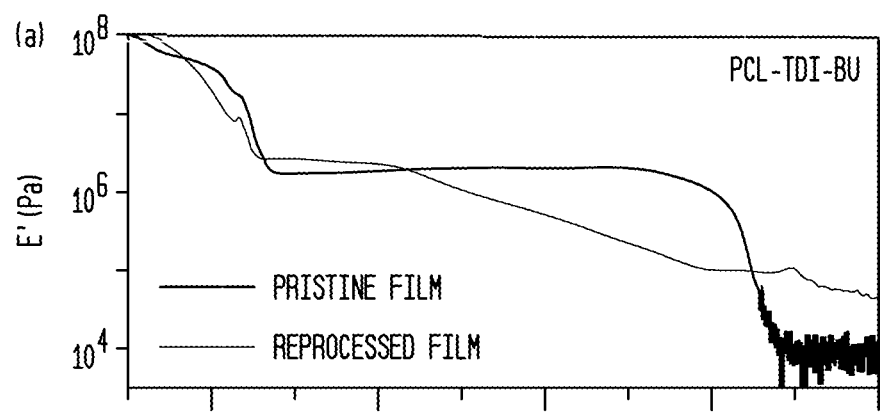
FIGS. 2A and 2B illustrate DMA temperature sweeps for pristine and reprocessed poly(bisurea) thermoplastic elastomers (FIG. 2Aa) PCL-TDI-BU and (FIG. 2Bb) PCL-MDI-BU. Data were collected with 1° C. min$^{-1}$ linear temperature ramp, 0.6% strain amplitude, and 6.28 s$^{-1}$ oscillation frequency.
Figure 2B:
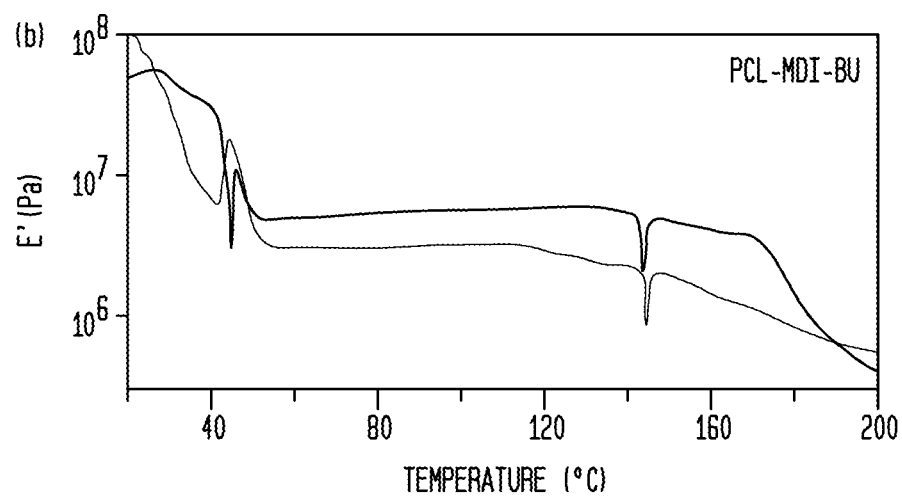

Thermomechanical and Phase Behavior. FIGS. 2A and 2B display stiffness curves obtained from dynamic mechanical analysis (DMA) temperature sweeps of pristine and reprocessed films. Loss tangent traces are reported in FIGS. 18A and 18B. All films exhibit crystalline elastic moduli $E_c'$ between 10 and 100 MPa. Above their melting temperature, $T_m$, pristine films exhibit rubbery moduli $E_r'$ with plateaus extending to 160° C., with the onset of flow observed at 170° C. DMA characteristics are mostly preserved after reprocessing, though at temperatures above 100° C., reprocessed films soften at lower temperatures than their pristine counterparts due to weakened fragmentation boundaries that were still present following melt-pressing. However, like the pristine samples, flow in the reprocessed samples did not occur until the temperature exceeded 170° C.

As an experimental control, a film was cast from unfunctionalized, linear PCL with similar MW characteristics. The control sample displayed a crystalline modulus about an order of magnitude higher than the poly(bisurea) films with viscous flow occurring just above $T_m$ (see Table S1 and FIG. 19)—at much lower temperatures than samples containing bisurea linkages. Thus, bisurea linkages alone impart high-temperature stiffness plateaus, while still allowing melt reprocessing at 180° C.

The phase behavior of poly(bisurea) films was further characterized by differential scanning calorimetry (DSC) and wide-angle X-ray scattering. DSC heating scans (FIG. 20) reveal sharp endotherms associated with melting of the poly(caprolactone) phase but no further thermal transitions up to 200° C. This may either be due to competition among hard-soft and hard-hard segmental interactions[28] or to the low content of bisurea segments, estimated to be 11 and 13 wt % for PCL-TDI-BU and PCL-MDI-BU, respectively. Moreover, wide-angle X-ray scattering only shows amorphous scattering in both samples, without detectable Bragg scattering over the scattering vector range from q=0.285 to 4.08 Å$^{-1}$ (FIGS. 21A-19D).

The amorphous nature of prepared poly(bisurea)s at temperatures well above PCL's melting point stands in contrast to most shape-memory polyurethanes and polyamides with phase segregated soft and hard segments.[29-32] Conventionally, soft segment crystallization serves to fix elastically deformed shapes, and high-melting-point, crystalline hard segments act as physical crosslinks to define the material's permanent shape; the material can be melt-processed if crystalline hard segments are melted. For the poly(bisurea)s reported here, the plateau modulus and flow behavior above $T_m$ are not governed by hard segment crystallinity but are attributed to chain entanglements. Previous studies have shown that amorphous entanglements can preserve stiffness above $T_m$, thereby enabling shape-memory in linear homopolymers.[33-35] Here, the plateau modulus in poly(bisurea) films is supported by amorphous PCL entanglements and is strengthened by intermittent association of bisurea groups.

Figure 3A:
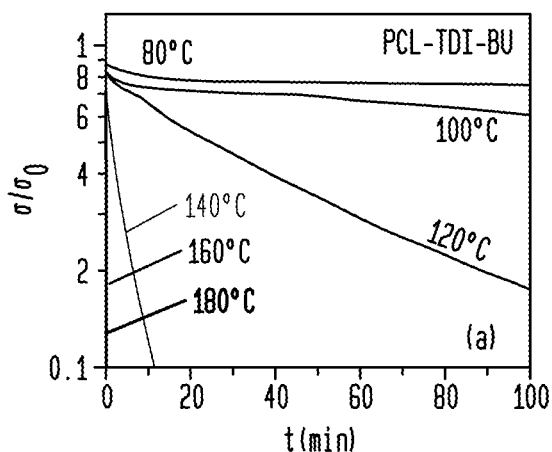
FIGS. 3A-3D illustrate stress relaxation curves for pristine poly(bisurea) films held at 20% strain and various temperatures for (a) PCL-TDI-BU and (b) PCL-MDI-BU; and plots of relaxation time versus inverse temperature for (c) PCL-TDI-BU and (d) PCL-MDI-BU. All 95% confidence intervals for $\tau_r$ are less than or equal to 15% of the corresponding values.
Figure 3B:
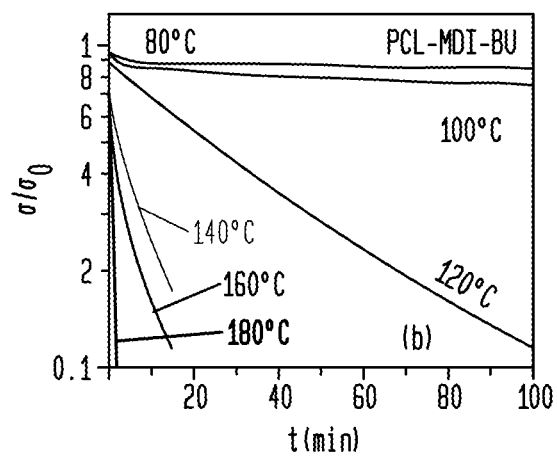
Figure 3C:
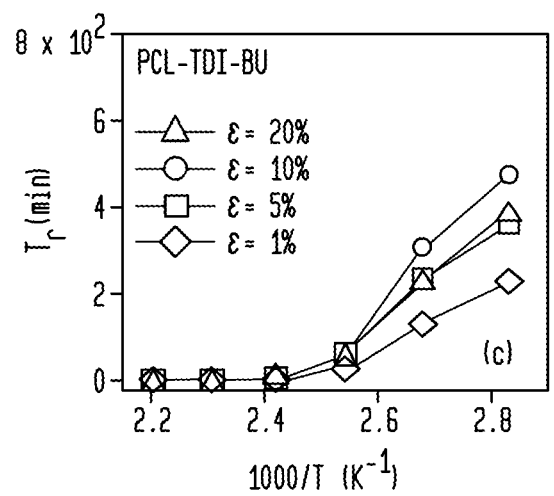
Figure 3D:
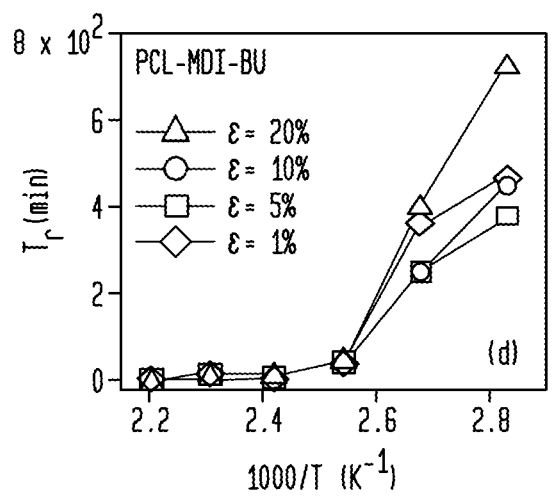

Stress Relaxation. Stress relaxation curves of pristine poly(bisurea) films held in tension at 20% strain are displayed in FIGS. 3A-3D. Stress decays exponentially with a single relaxation time $\tau_r$ at each temperature, consistent with the disappearance of load-bearing entanglements by reptation.[36] The relaxation time shows a strong, non-Arrhenius temperature dependence and a weak strain dependence from zero to 20% strain (FIGS. 3c, 3d). Both PCL-TDI-BU and PCL-MDI-BU lose the majority of tensile stress when held above 140° C. for 15 minutes under applied strains of 1-20% (FIGS. 22A and 22B). Tensile creep experiments performed at a constant temperature ramp rate (1.0° C. min$^{-1}$) also indicate the onset of strain occurs around 140° C. (FIGS. 23A-23B). At 180° C., owing to nearly instantaneous stress loss, mechanically fragmented pristine poly(bisurea) films could be hot-pressed into reprocessed films.

The long relaxation time of poly(bisurea)s above $T_m$ is ascribed to additional molecular friction from hydrogen bonding elements, slowing Brownian motion. At 80° C. and 20% strain, PCL-TDI-BU and PCL-MDI-BU respectively retained 73% and 82% of initial stress after five hours, while the control PCL homopolymer, with a comparable number of entanglements per chain, experienced complete stress loss in seconds (FIG. 24). The significantly longer relaxation times in poly(bisureas) are attributed to an increase in friction resulting from equilibration of hard-soft (urea N—H . . . O═C PCL ester) and hard-hard (urea N—H . . . O═C urea) segmental H-bonds. Considering that friction is proportional to $d\tau_r/d(1/T)$ in reptation theory,[36] the experimental data in FIGS. 3C and 3D indicate greater friction at low temperatures, where more H-bonding is expected. This additional friction slows chain reptation and pullout, while maintaining stress and preserving modulus, validating lateral H-bonding as an effective approach to controlling stress relaxation.

Shape-Memory and Stress Training. The elasticity and stress retention of poly(bisurea)s offer opportunities for shape-programming. "Hot-draw" shape-memory of poly(bisurea) films was evaluated through thermomechanical cycling with initial loading above the crystalline melting point. Similarly, "cold-draw" experiments with initial loading in the crystalline state are provided as supplementary information (FIGS. 25-25F).

Figure 4C:
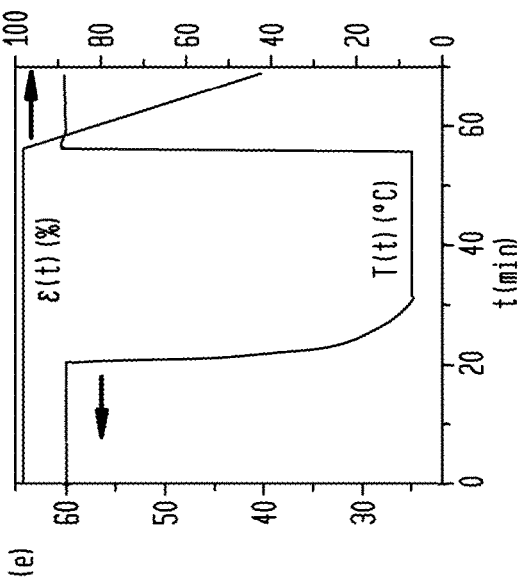
FIGS. 4A-4F illustrates hot-draw shape-memory thermomechanical cycles to 25%, 50%, 100% and 200% strain for (FIG. 4Aa) pristine PCL-TDI-BU and (FIG. 4B) pristine PCL-MDI-BU; plots of the shape recovery ratio versus cycle number for pristine and reprocessed (FIG. 4C) PCL-TDI-BU and (FIG. 4D) PCL-MDI-BU.
Figure 4E:
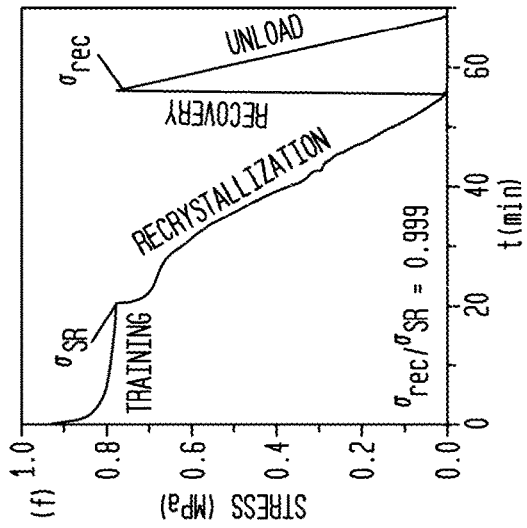
Figure 4A:
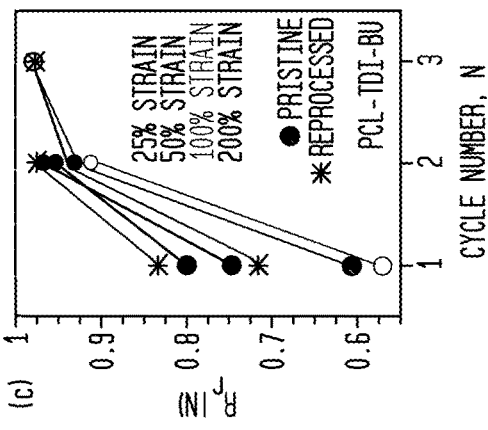
Figure 4B:
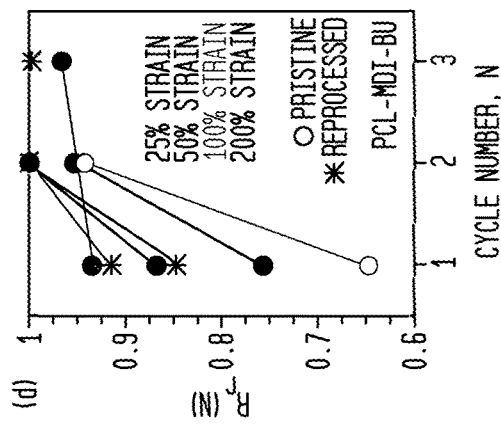
Figure 4D:
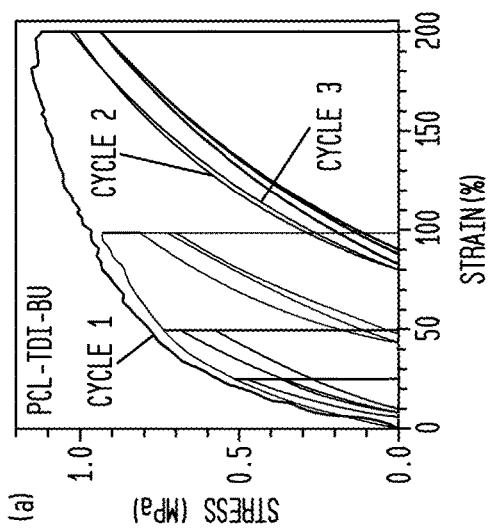
Figure 4F:
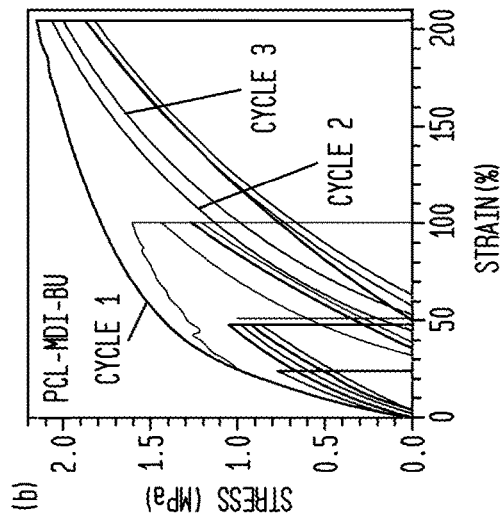

FIGS. 4A and 4B display hot-draw shape memory cycles of films in stress-strain space. Pristine films were first deformed at 60° C. to a specified maximal strain $\varepsilon_m$, equilibrated for 20 minutes to allow for stress relaxation, and cooled to 25° C. to crystallize for 40 minutes or until stress completely vanished while holding strain under isothermal conditions. Stress was then removed and the fixed strain $\varepsilon_f$ was recorded to quantify the strain fixity ratio of cycle N defined as $R_f(N)=\varepsilon_f(N)/\varepsilon_m$. The fixity ratio was near unity for all cycles shown in FIGS. 4a-4b (see Tables S2, S3). After fixing, the sample was melted while maintaining strain, and tension was regenerated. The strain was then reduced at a constant rate until tension was completely removed, and the remaining strain $\varepsilon_r$ reflects how well the sample can recover its original shape. Shape recovery is quantified by the shape recovery ratio as $R_r(N)=(\varepsilon_m-\varepsilon_r(N))/(\varepsilon_m-\varepsilon_r(N-1))$, and the ratio improves following each cycle, with the largest improvement observed between the first and second cycles. Such shape-training was observed in both pristine and reprocessed films. Shape-memory stress-strain curves for reprocessed films are shown in FIGS. 27A-27B. High shape recovery ratios (≥0.9) are noted in all second cycles, and the ratio continues to improve in the third cycle.

Shape-training in semicrystalline shape-memory networks has been previously reported and is ascribed to the destruction of weak physical crosslinks during the initial shape-memory cycle, resulting in permanent creep strain of the amorphous network.[29] While training reduces shape recovery in the first cycle, the remaining entanglements are robust, and can withstand comparable tensile stresses, offering greater recovery in subsequent cycles. In each thermomechanical shape-memory cycle reported in FIGS. 4A-4F, training occurs when a sample is deformed above $T_m$ as a rubbery network and is equilibrated for 20 minutes above its melting point. During this period, stress relaxation proceeds just as in FIGS. 3A-3D, and weaker entanglements disappear. Only the surviving entanglements store elastic energy and give rise to stress recovery triggered under fixed strain as observed in FIGS. 4A-4F. Accordingly, the re-emergent stress, $\sigma_{rec}$, nearly matches the stress recorded at the end of the training period, $\sigma_{SR}$ (FIG. 4E). Across all hot-draw cycles, the ratio of these stresses ($\sigma_{rec}/\sigma_{SR}$) was 1.016±0.024 in 95% confidence.

To further probe the connection between stress relaxation and training, bisurea film samples were pre-trained by stress relaxation at 50%, 100%, and 150% strain and subjected to three shape-memory cycles, all at 100% peak strain (FIGS. 28A-28F). FIGS. 29A and 29B show that training significantly improves the first-cycle strain recovery ratio. Training at high extension (100% and 150%) further enhances shape recovery, suggesting that excellent elasticity can be obtained by training at higher stresses than those experienced during the subsequent shape-memory cycling.

To offer further insight into shape-training, elastic and plastic deformation were monitored as a function of stress and time through "creep staircase" experiments. Poly(bisurea) films were held at a constant stress for eight minutes, followed by load removal and observation for two minutes. The cycle was repeated 20 times isothermally (60° C.) with the applied stress beginning at 0.2 MPa and increasing by 0.2 MPa every other cycle to end with a 2-MPa load. Results are shown in FIGS. 5A-5D.

Figure 5A:
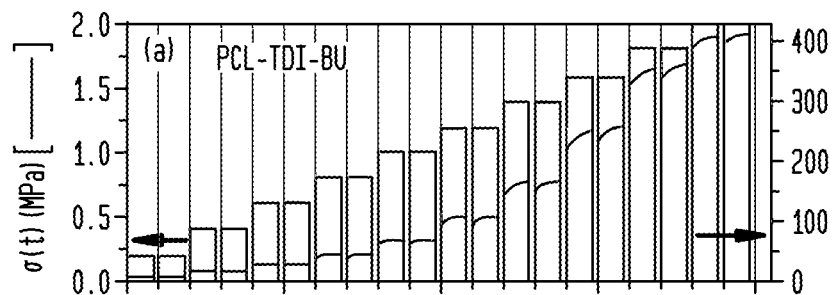
FIGS. 5A-5D show creep staircase experiments designed to separate elastic and plastic deformation: stress and strain response plotted against time at 60° C. for (FIG. 5A) PCL-TDI-BU and (FIG. 5B) PCL-MDI-BU.
Figure 5B:
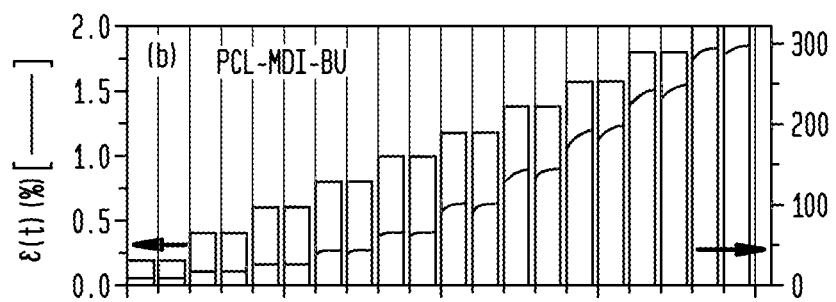
Figure 5C:
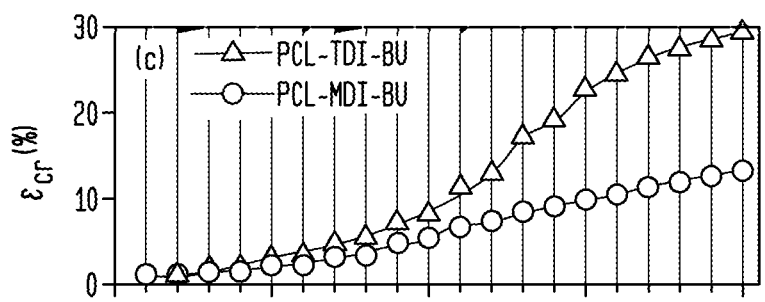
Figure 5D:
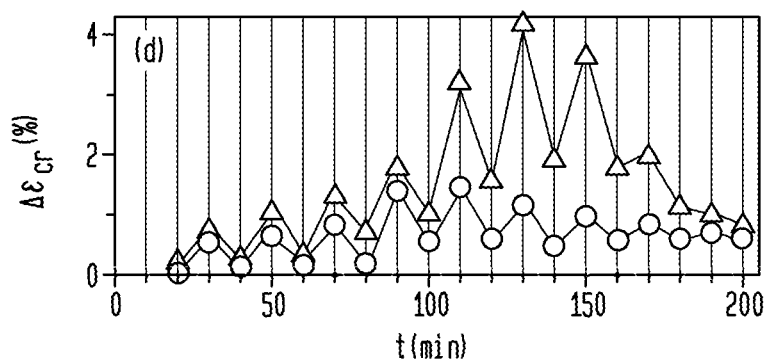
Figure 6:
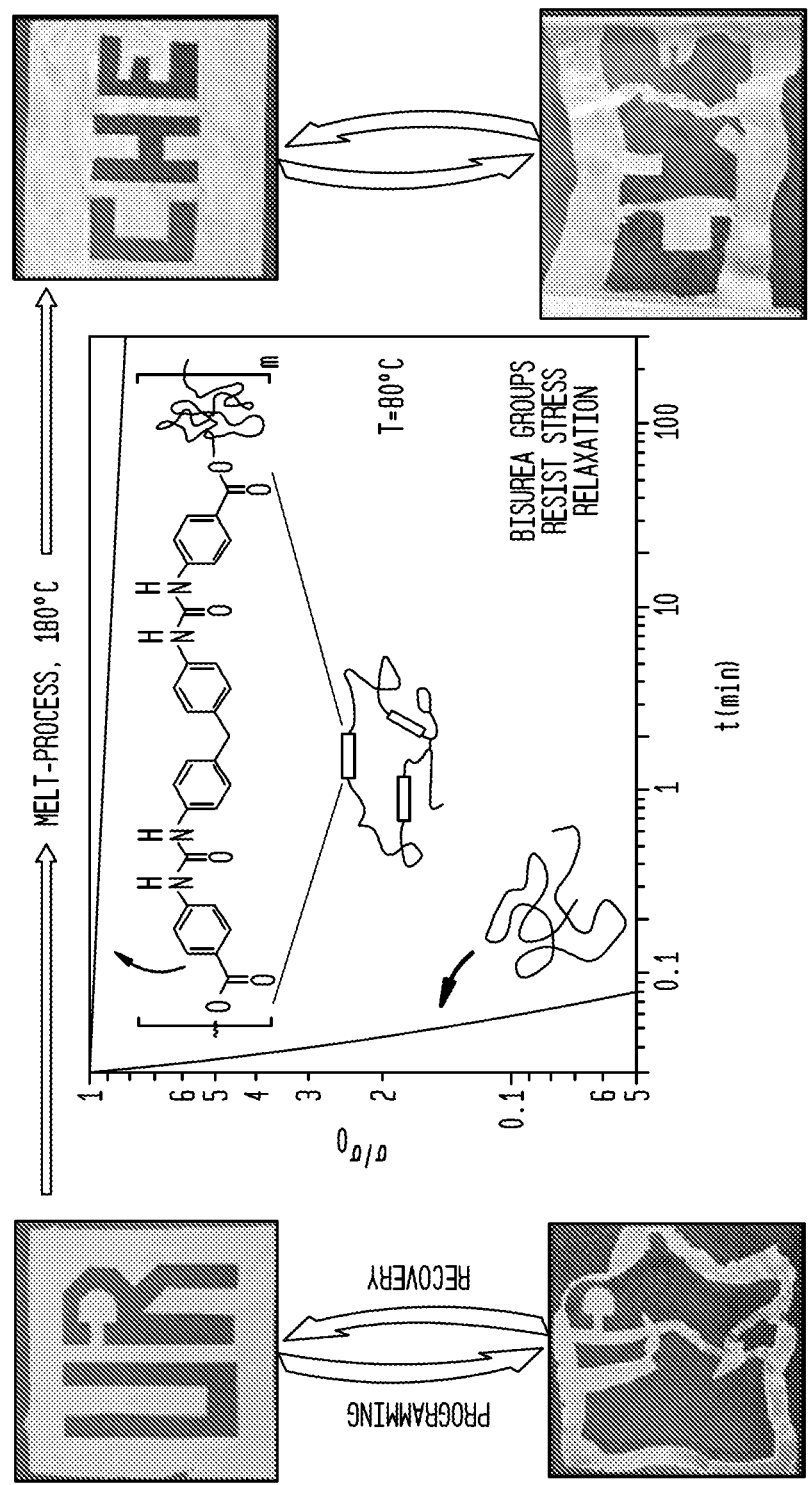
FIG. 6 is a graphic entry of representative subject matter discussed in this patent specification.

The creep experiments reveal that poly(bisurea) films exposed to greater applied stresses experience permanent creep strain that depends on the cycle's applied stress. FIG. 5C displays the cumulative permanent creep strain measured after unloading, $\varepsilon_{cr}$, and FIG. 5D shows the incremental creep strain $\Delta\varepsilon_{cr}$ acquired during each cycle, $\Delta\varepsilon_{cr}=\varepsilon_{cr,i}-\varepsilon_{cr,i-1}$. For every pair of applied loads of equal stress, the strain transients are similar in magnitude and shape, showing that creep does not disrupt the continuity of elastic behavior once a new stress threshold has been attained. Although the exact origin of creep is unclear, creep is attributed to the irreversible removal of chain entanglements or physical crosslinks. The sawtooth pattern in FIG. 5D shows that increases in plastic deformation are chiefly correlated to exposures to new, higher stress thresholds. Furthermore, as the applied stress increases, the sawtooth pattern disappears, indicating a similar amount of creep is generated for each successive load. Here, only the most deeply entangled chains maintain entropy elasticity, with insufficient time during a single loading to remove these entanglements.

This patent specification demonstrates that integrating H-bonding bisurea linking groups into poly(caprolactone) can significantly slow stress relaxation, enabling facile reprocessing of shape-memory elastomers and opening a "green physics" pathway to reprocessable and recyclable elastomers from linear polymers. Through the synergy of lateral bisurea interactions and chain entanglements, polymers achieve favorable and long-lived elasticity that would otherwise require much higher molecular weights in unfunctionalized homopolymers. Furthermore, the discussion herein provides new insight that directly connects stress relaxation with training of semicrystalline shape-memory elastomers.

Supporting information. Supporting materials including FIGS. 13-29B and Tables S1-S5 provide further insight into the materials and methods described above.

Figure 7:
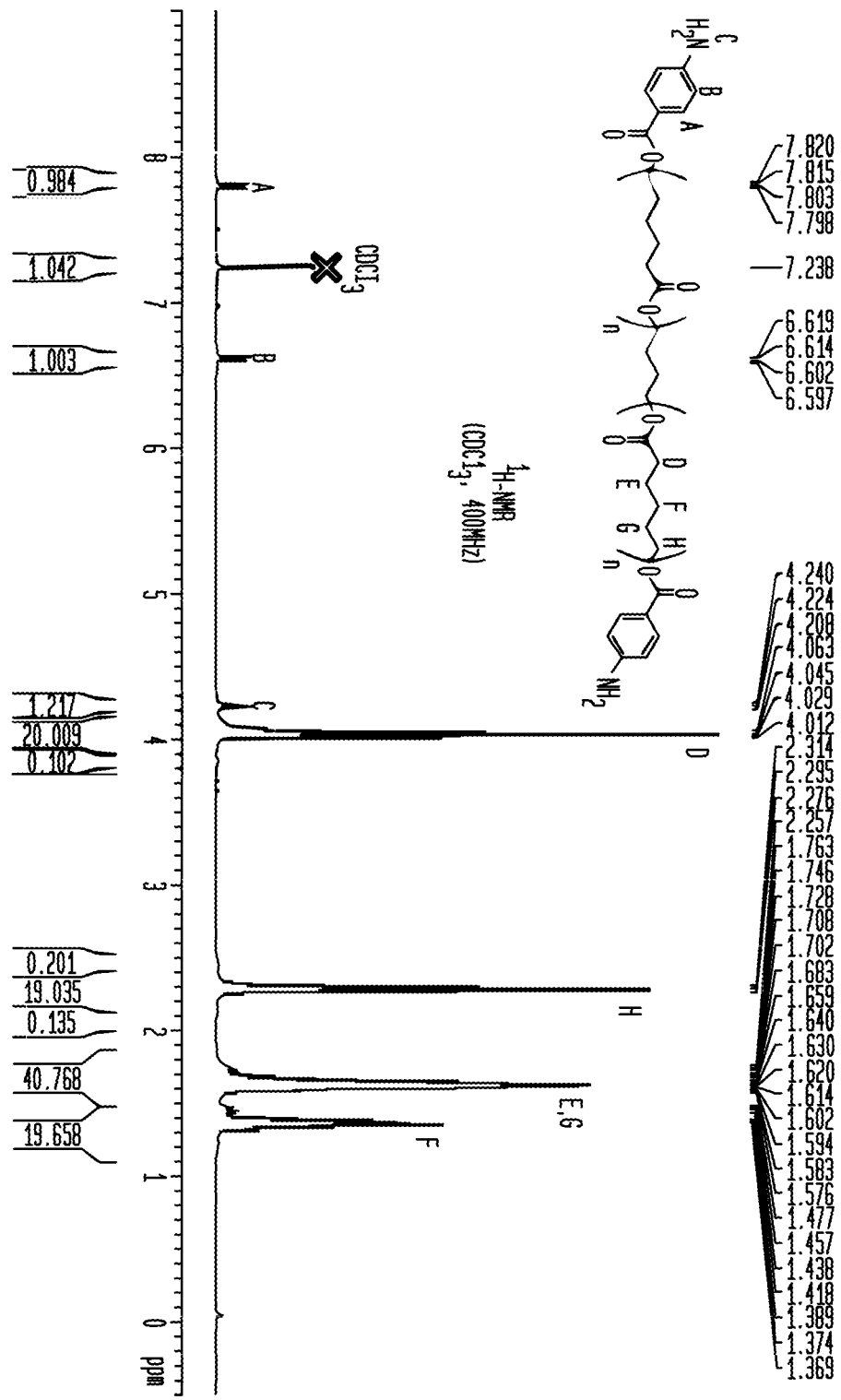
FIGS. 7 and 8 show $^1$H-NMR spectra of PCL prepolymer and linear unfunctionalized PCL.
Figure 8:
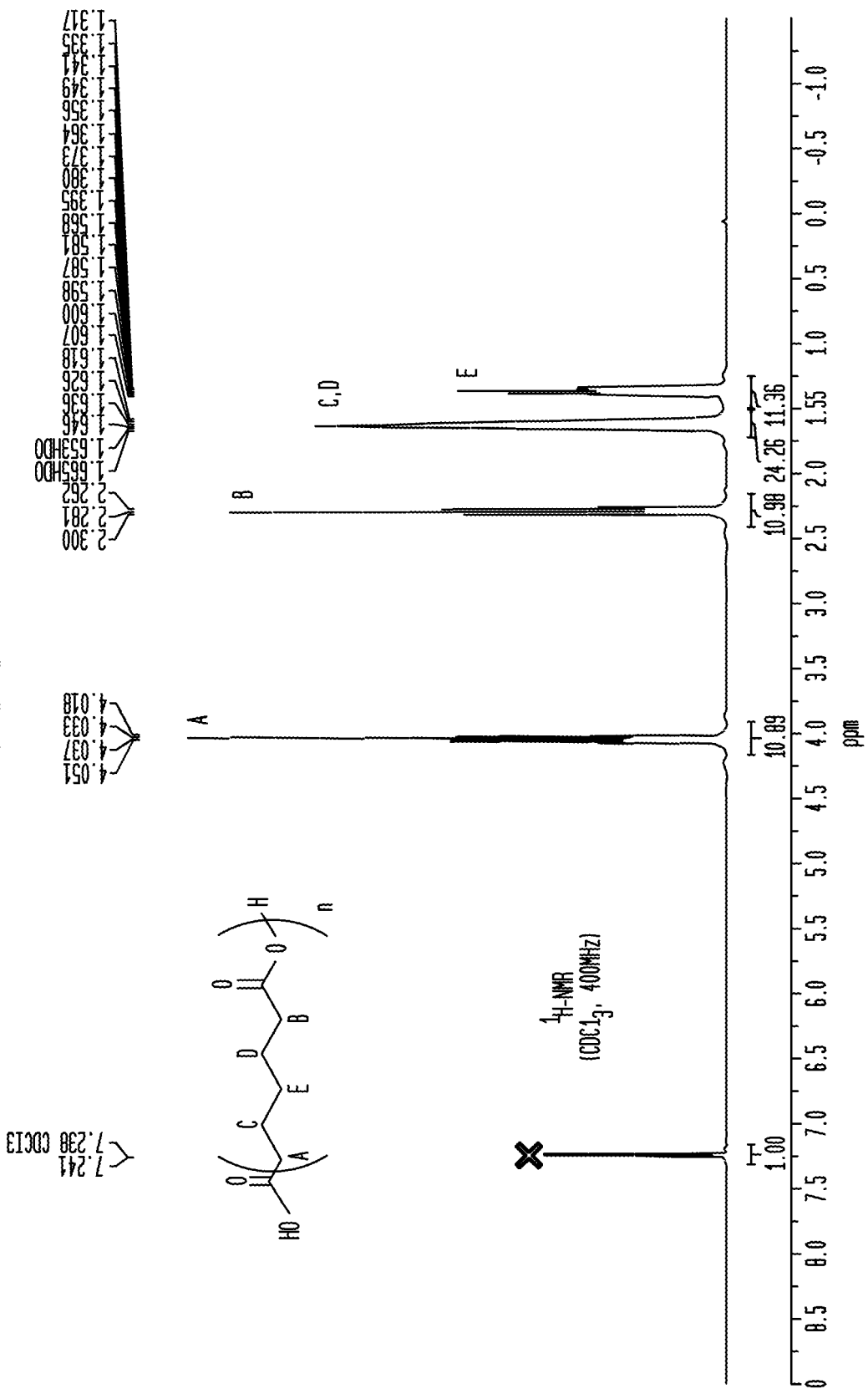
Figure 9:
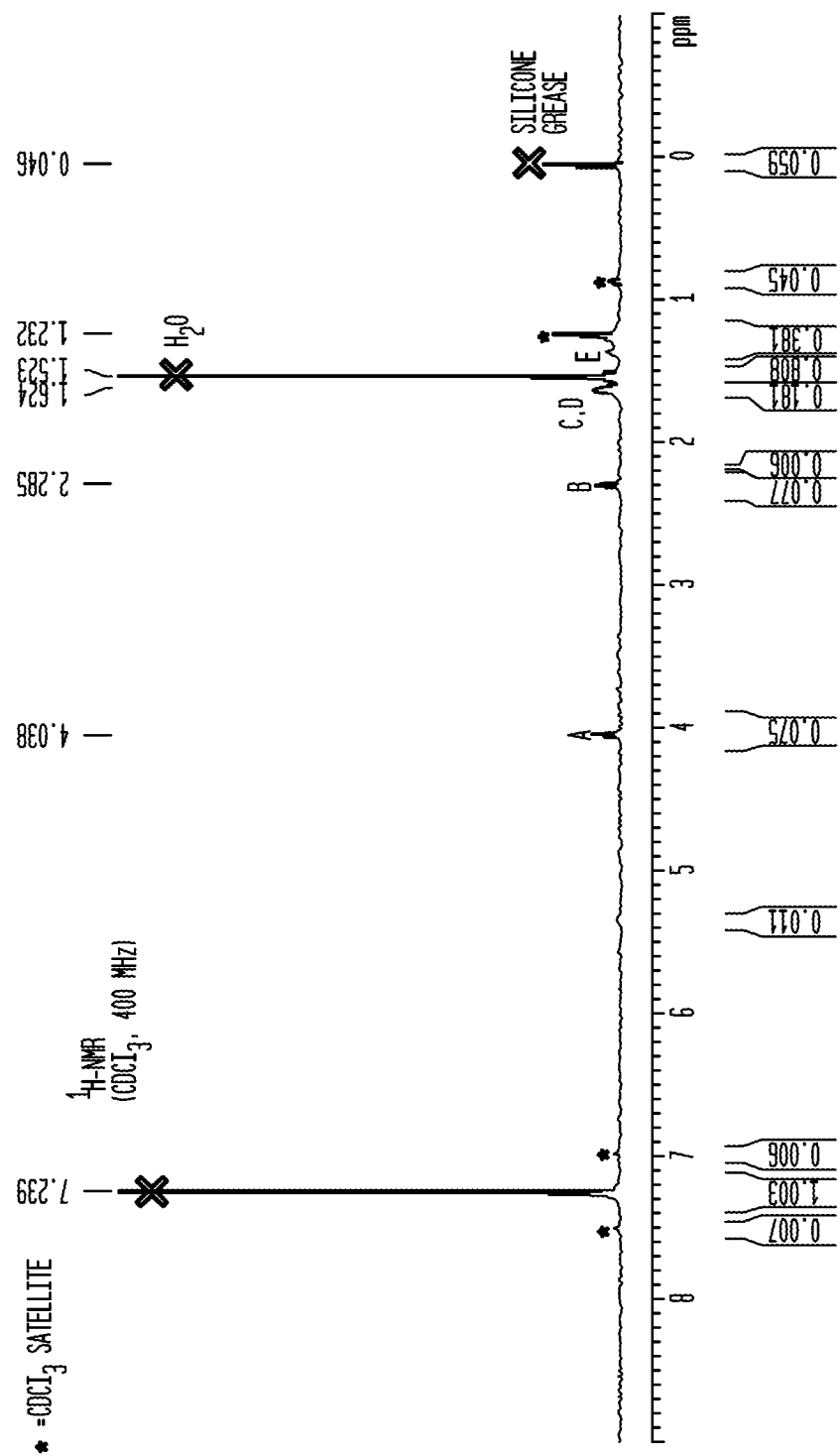
FIGS. 9 and 10 show $^1$H-NMR spectra of pristine and reprocessed PCL-TDI-BU.
Figure 10:
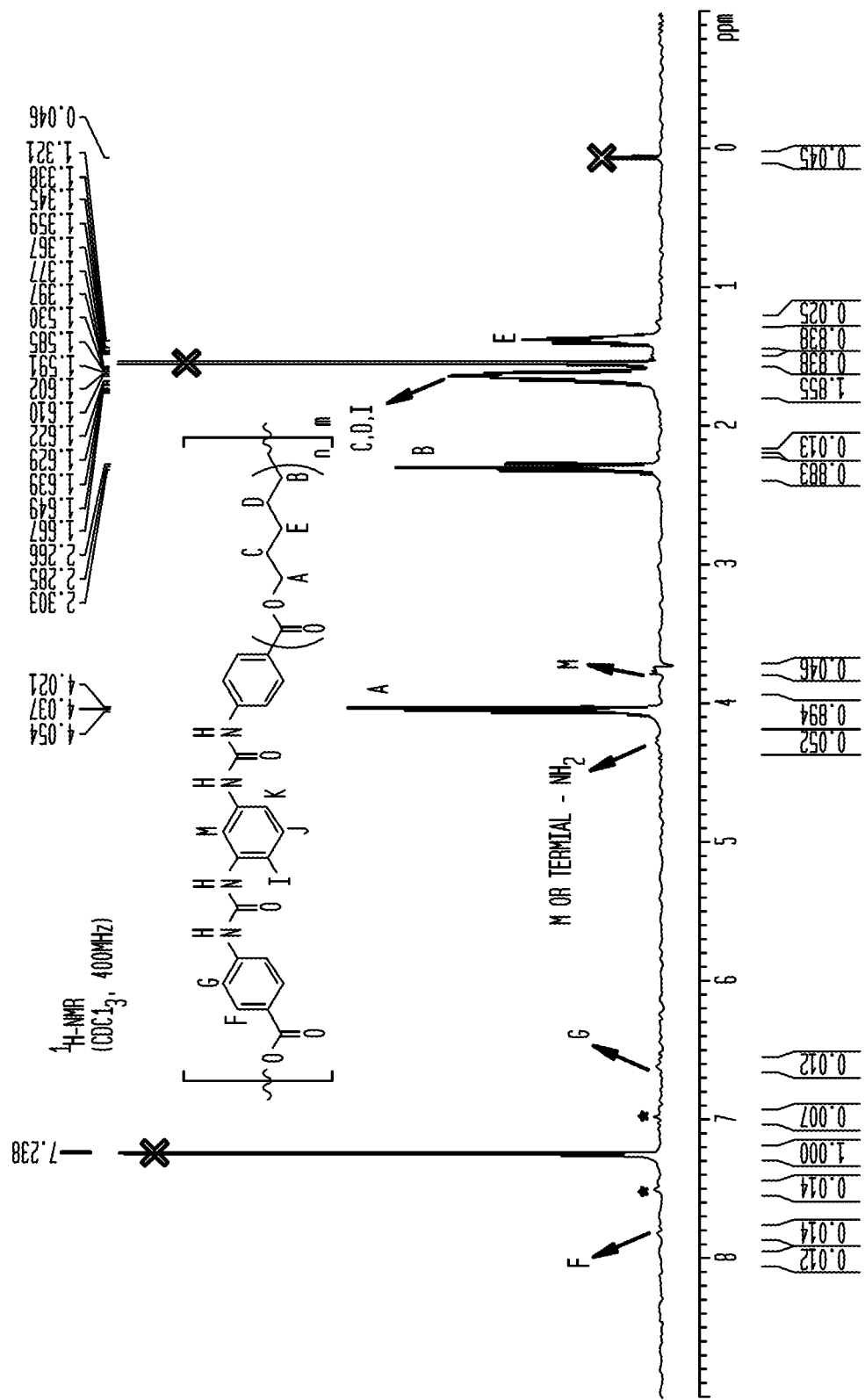
Figure 11:
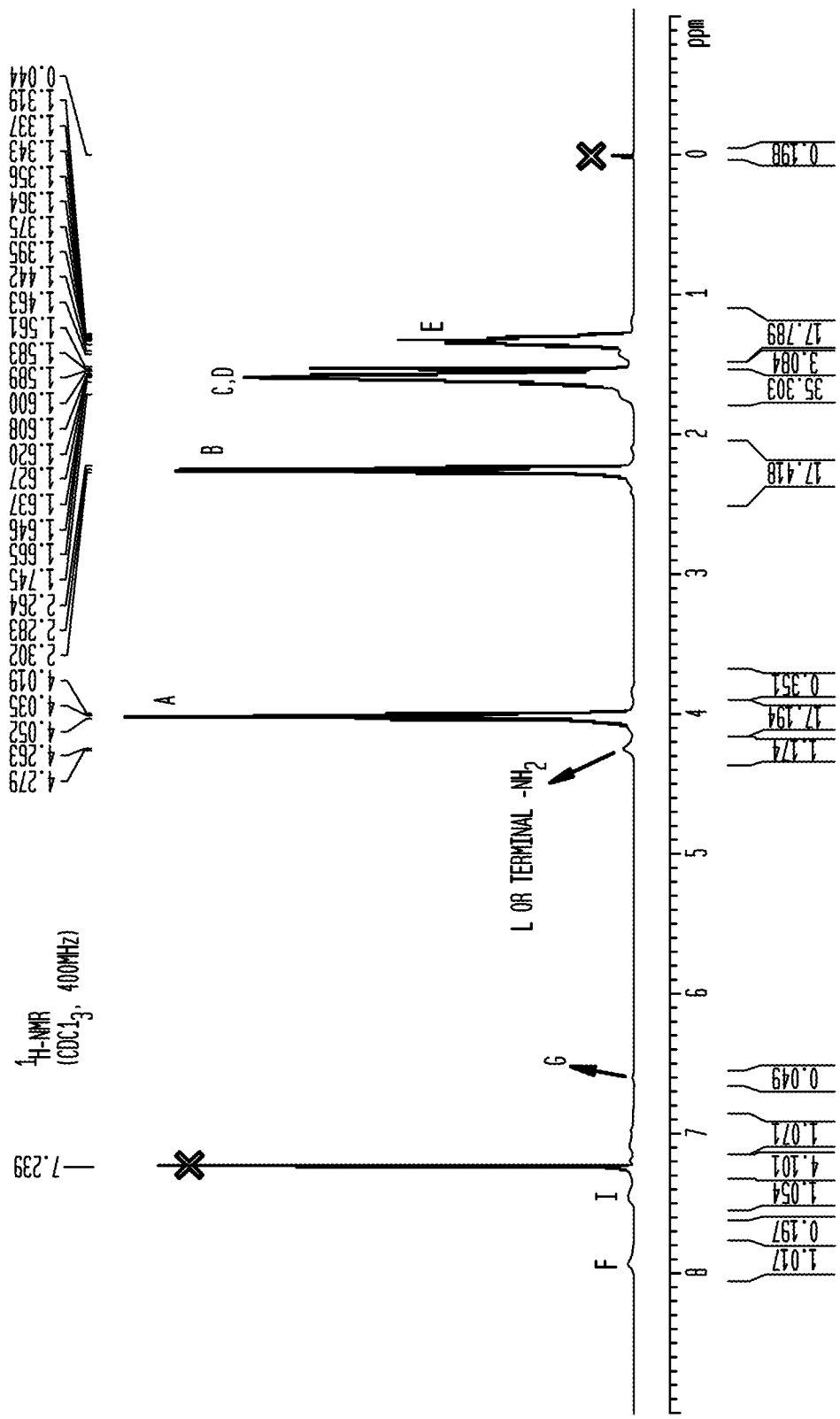
FIGS. 11 and 12 show $^1$H-NMR spectra of pristine and reprocessed PCL-MDI-BU.
Figure 12:
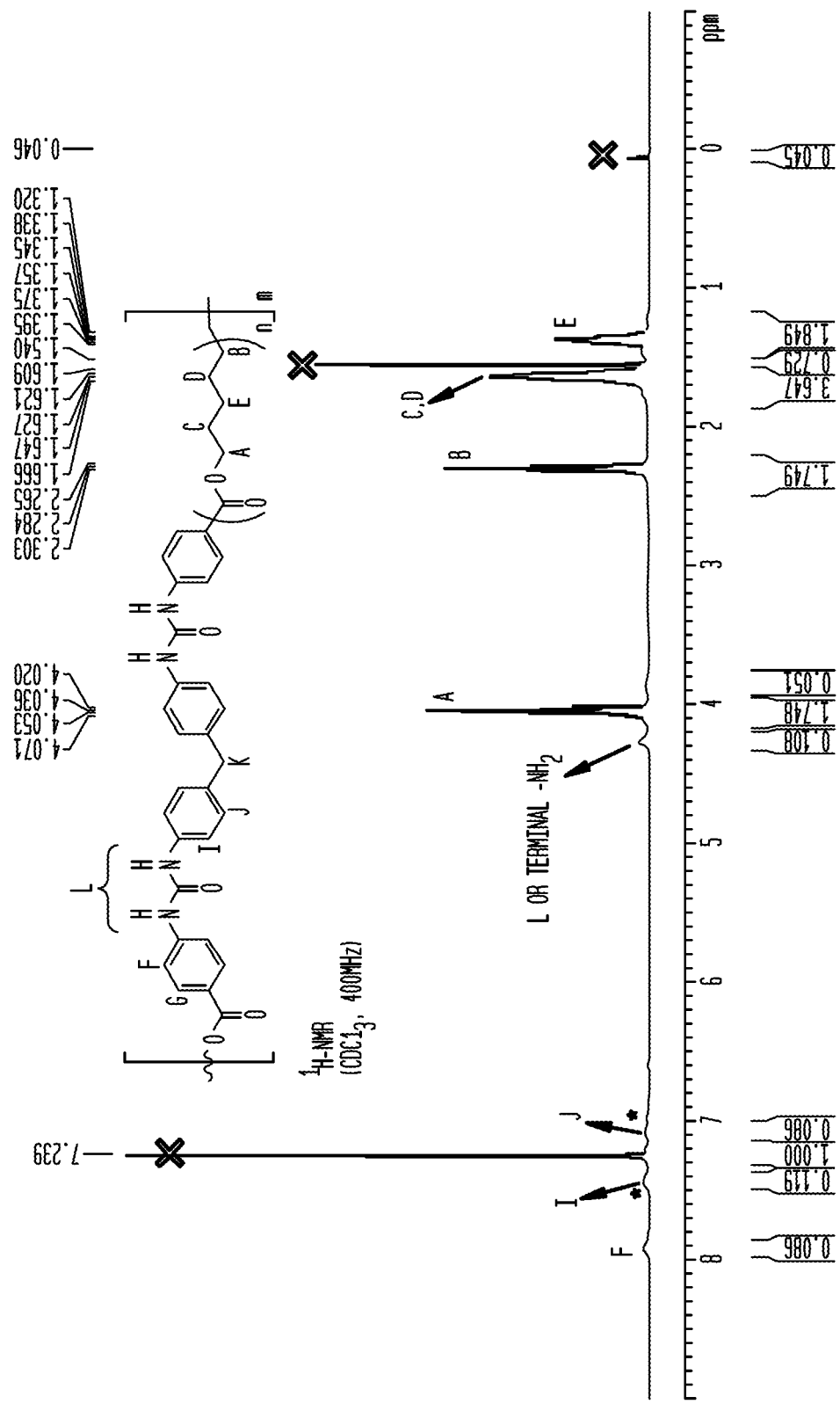
Figure 13:
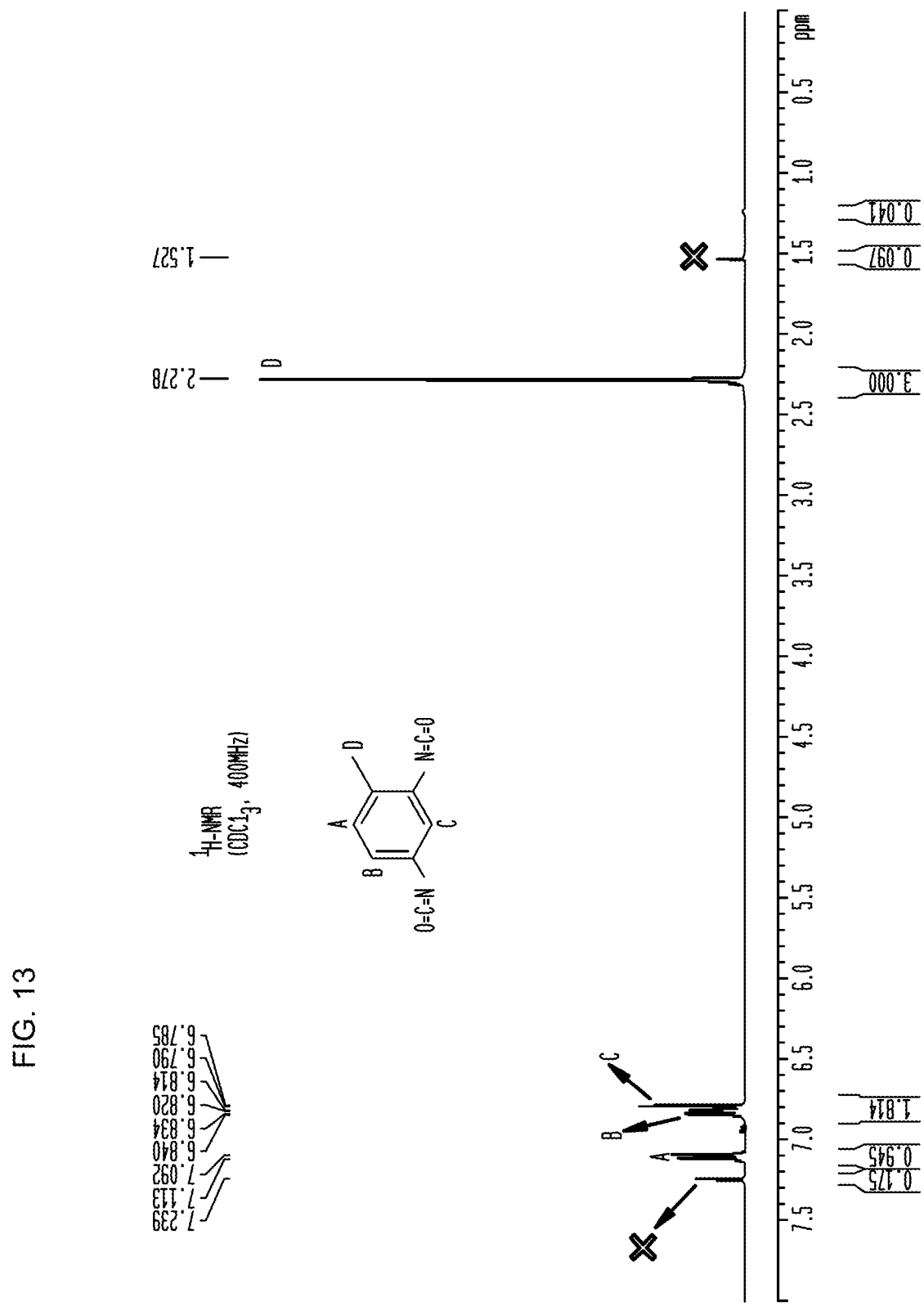
FIGS. 13 and 14 show $^1$H-NMR spectra of diisocyanate linkers TDI and MDI.
Figure 14:
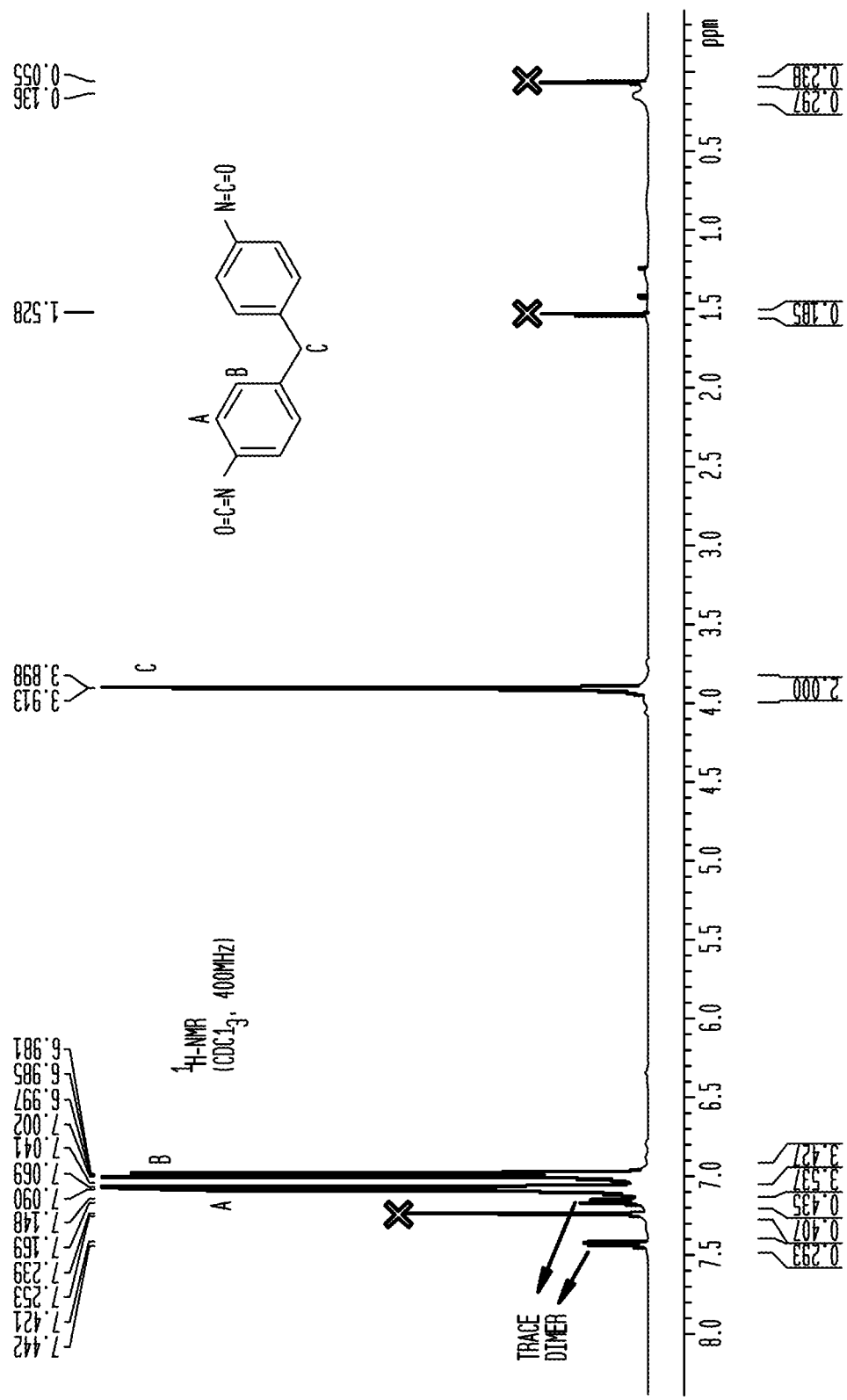

FIG. 7 shows $^1$H-NMR spectrum of phenylamine-terminated PCL telechelic prepolymer. FIG. 8 shows $^1$H-NMR spectrum of linear unfunctionalized PCL homopolymer. FIG. 9 shows $^1$H-NMR spectrum of pristine PCL-TDI-BU film. See below for proton denotations. Hard segment and terminal protons' resonances are not definitively assigned. Bisurea films had best, though poor, solubility in CDCl$_3$. The peaks with black asterisks (*) correspond to unidentified impurities. FIG. 10 shows $^1$H-NMR spectrum of reprocessed PCL-TDI-BU film. Hard segment and terminal protons' resonances are not definitively assigned. FIG. 11 shows $^1$H-NMR spectrum of pristine PCL-MDI-BU film. See below (FIG. 12) for proton denotations. Hard segment and terminal protons' resonances are not definitively assigned. FIG. 10 shows $^1$H-NMR spectrum of reprocessed PCL-MDI-BU film. Hard segment and terminal protons' resonances are not definitively assigned. FIG. 13 shows $^1$H-NMR spectrum of TDI used for chain extension. FIG. 14 shows $^1$H-NMR spectrum of MDI used for chain extension.

FIGS. 15A-15D show ATR-FTIR spectra of reagents and products: (a) Full spectra, arbitrary normalized intensities; spectra for prepolymer and reprocessed poly(bisurea) films magnified in the (b) N—H bending, (c) N—H stretching, and (d) C=O stretching regions. In FIG. 15A, it can be seen that the diisocyanate N=C=O stretch at 2270-2260 cm$^{-1}$ is completely absent from the poly(bisurea) films' spectra, indicating completion of the chain extension. Reprocessing slightly reduced film thickness, improving IR signal resolution, and so the reprocessed films' spectra are plotted in FIGS. 15B-D. The prepolymer's primary amine functionality is evidenced by two peaks, respectively, for asymmetric and symmetric N—H bending, 1630 and 1605 cm$^{-1}$ (FIG. 15B, ii), and two peaks, respectively, for asymmetric and symmetric N—H stretching, 3460 and 3374 cm$^{-1}$ (FIG. 15C). These peaks are blue-shifted by ~10 cm$^{-1}$ but are consistent in spacing with respect to the corresponding wavenumbers reported for aniline as a model compound for the terminal phenylamine groups.[1a] The PCL C=O stretch peak (FIG. 15D) is centered at 1724 cm$^{-1}$ with a wide, low-wavenumber shoulder, which is consistent with literature data.[2a] In contrast, the poly(bisurea) films show peaks at 1595 (FIG. 15B, iii) and 1538 cm$^{-1}$ (FIG. 15B, iv), which are respectively attributed to the H-bonded urea C=O stretch and the urea (O)C—N—H bend.[3a,4a] The peaks are centered at wavenumbers intermediate between those reported for polyurea and 1,3-diphenylurea, though an exact correspondence is not expected due to coupling[5a] and a difference in chemical environment.[3a,6a] The free urea C=O stretch, expected at ~1690 cm$^{-1}$, appears as a shoulder on the low-wavenumber side (FIG. 15B, i) of the dominant PCL ester C=O stretch peak,[3a] though it is difficult to resolve due to the latter's broadness resulting from soft segment H-bonding (FIG. 15D). Free and H-bonded urea N—H stretching peaks are respectively expected at ~3450 and ~3320 cm$^{-1}$, and the broad convolved peaks extending over this range shown in (c) suggest the coexistence of both IR modes.[3a,4a,7a]

Figure 16:
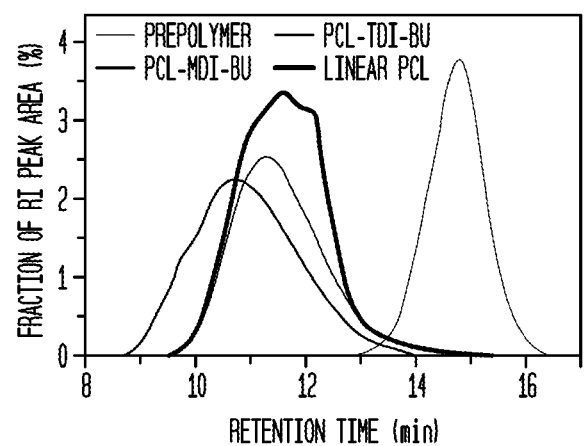
FIG. 16 and Table S1 show GPC data and molecular weight analysis.

FIG. 16 shows normalized refractive index curves obtained from GPC for prepolymer, pristine poly(bisurea) films, and linear PCL.

Table S1 is reproduced below and shows results of molecular weight analysis obtained using PCL standard calibration curve.

| Specimen | $M_n$ (kg mol$^{-1}$) | $M_w$ (kg mol$^{-1}$) | PDI |
|---|---|---|---|
| Prepolymer | 3.0 | 3.7 | 1.2 |
| PCL-TDI-BU | 44 | 100 | 2.3 |
| PCL-MDI-BU | 76 | 290 | 3.8 |
| Linear PCL | 40 | 90 | 2.2 |

PCL standards for GPC were purchased from Scientific Polymer Products:
$M_n$ = 2,270 g mol$^{-1}$, $M_w$ = 2,380 g mol$^{-1}$;
$M_n$ = 12,600 g mol$^{-1}$, $M_w$ = 12,900 g mol$^{-1}$;
$M_n$ = 39,400 g mol$^{-1}$, $M_w$ = 41,000 g mol$^{-1}$;
$M_n$ = 87,200 g mol$^{-1}$, $M_w$ = 96,500 g mol$^{-1}$;
$M_n$ = 188,100 g mol$^{-1}$, $M_w$ = 200,700 g mol$^{-1}$.

Figure 18A:
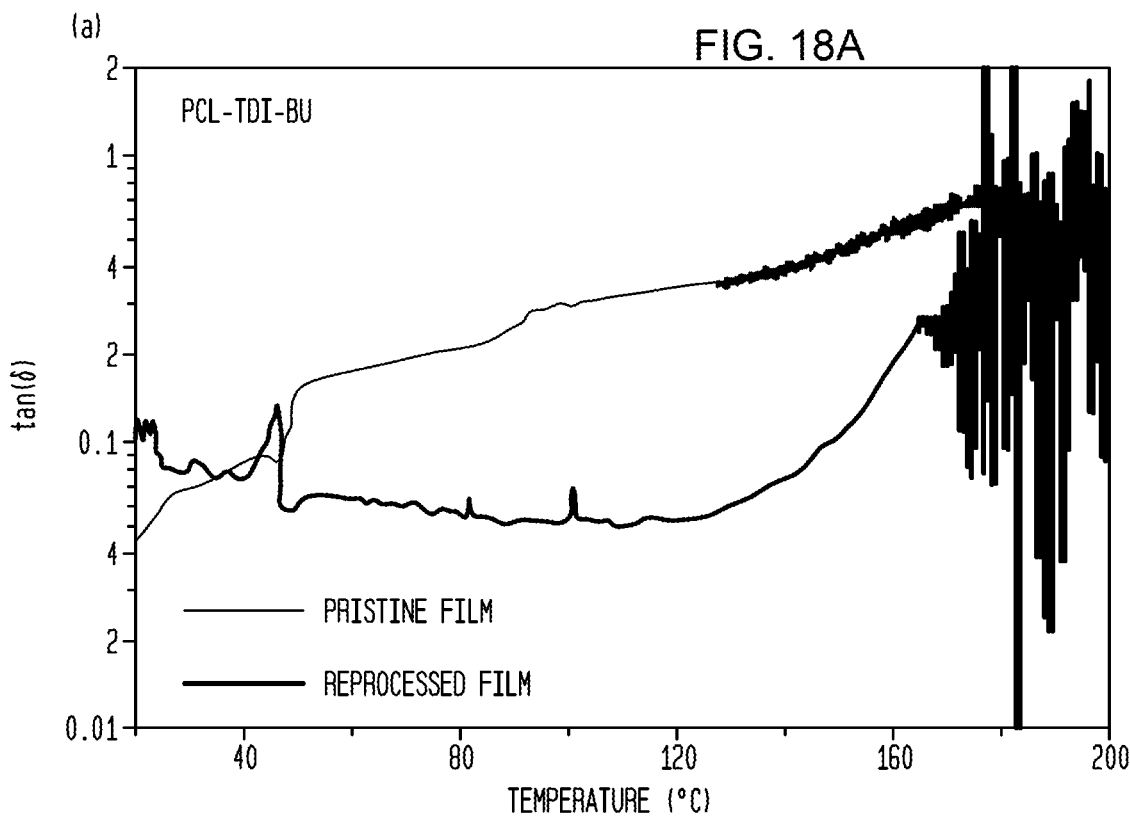
FIGS. 18A and 18B S12 show DMA loss tangent traces for poly(bisurea) films.
Figure 18B:
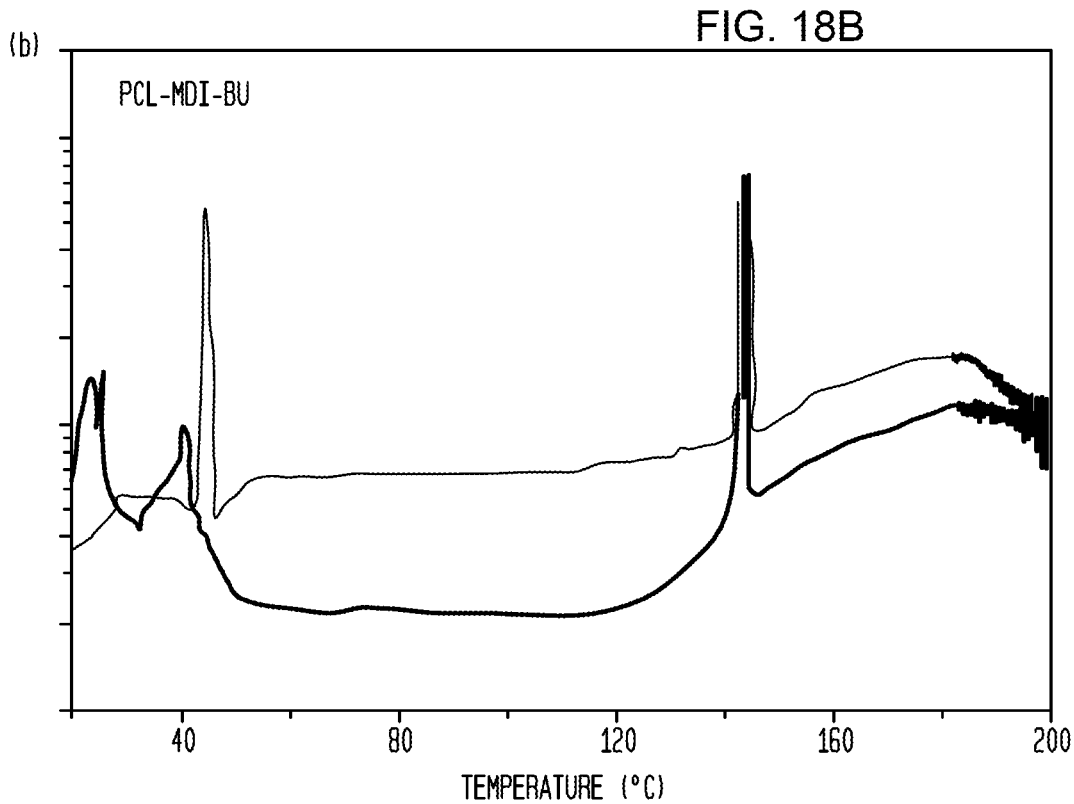

FIGS. 17A and 17B show stress-strain curves for pristine PCL-TDI-BU and PCL-MDI-BU films in strain-to-break experiments. Insets show magnified neo-Hookean regimes. PCL-TDI-BU's apparent stress peak at 1500% strain is a slippage artifact. FIGS. 18A and 18B show DMA loss tangents for poly(bisurea) thermoplastic elastomers. Peaks are observed at $T_m$ as expected, and at higher temperatures, the loss tangent plateaus in both pristine and reprocessed samples, enabling elasticity. The reprocessed films were incompletely healed along fragmentation boundaries, causing their loss tangents to plateau at higher values. Between 120° C. and 140° C., the loss tangents begin to increase, signaling an increased rate of chain reptation, though the continuity of the stiffness curves is unaffected (FIG. 2). This transition manifests in the abrupt increase in the rate of stress decay (FIG. 3) and permanent strain in a tensile creep experiment (FIG. 24). FIG. 19 shows DMA temperature sweep for linear PCL homopolymer. Storage modulus is plotted on the left axis and the loss tangent on the right.

As shown above, the dynamic mechanical behavior of the unfunctionalized PCL homopolymer differs considerably from that of the poly(bisurea)s (FIGS. 2A and 2B). The PCL homopolymer lacks a rubbery plateau, melting completely at 60° C. Though there is an apparent E' plateau, the loss tangent is ~2 for this region, indicating that the crossover point occurs with melting and that the homopolymer behaves as a viscous liquid. In contrast, the poly(bisurea)s exhibited a loss tangent of no greater than ~0.2 and $E_r'$ greater than 1 MPa in their rubbery plateau regions, showing thermally stable elastomeric behavior. The increase in noise after the PCL melting temperature is also characteristic of complete melting, as the instrument force transducer's measurement oscillations become large relative to the precision of the force channel signal.

Figure 20:
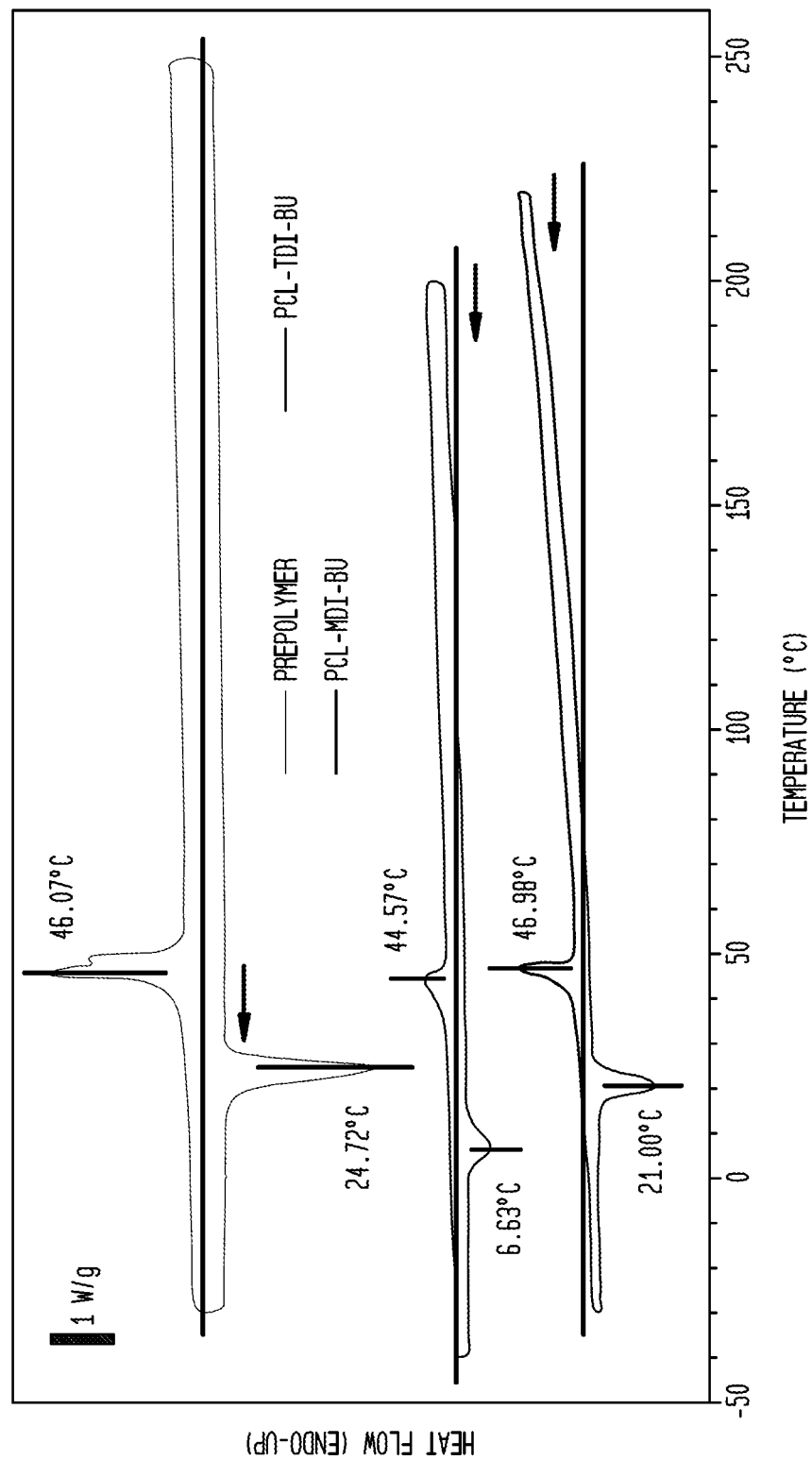

FIG. 20 shows DSC thermal scans of prepolymer and pristine poly(bisurea) films. Each heating scan is the second collected for each sample. Horizontal black lines indicate the axis of zero heat flow for each respective scan. Vertical black lines mark peak maxima and are labeled with the corresponding temperatures. The initial temperature and scanning direction of each trace is denoted by its arrow. The poly(bisurea)s' melting endotherm occurs at the same temperature as the prepolymer. On cooling, a large thermal hysteresis is observed. For the poly(bisurea)s, the degree of undercooling required for recrystallization of the PCL soft segments increases, which is consistent with hard-soft segmental phase mixing resulting in the softening of the crystalline state seen in DMA experiments. Additionally, compared to the PCL prepolymer, the poly(bisurea)s display a more pronounced increase in heat capacity during heating, which causes continued endothermic heat flow at high temperatures even during the cooling scan.

Figure 21B:
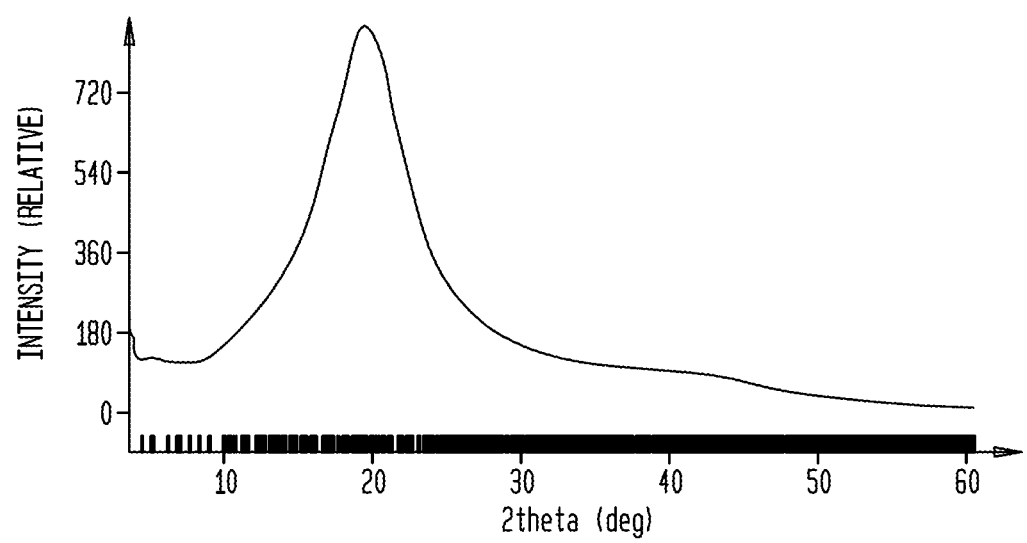
Figure 21C:
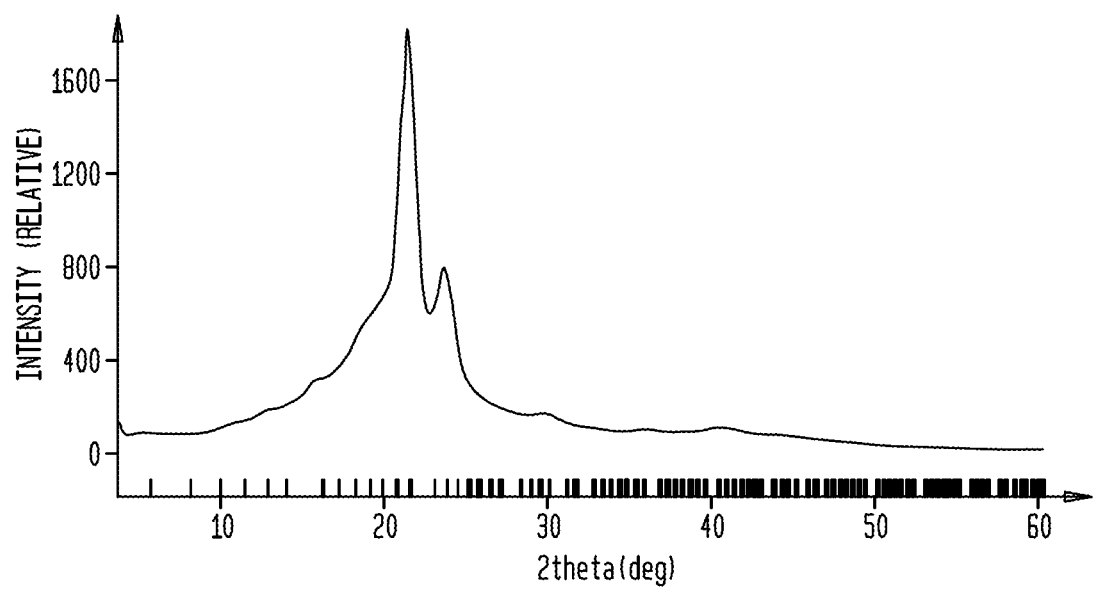
Figure 21D:
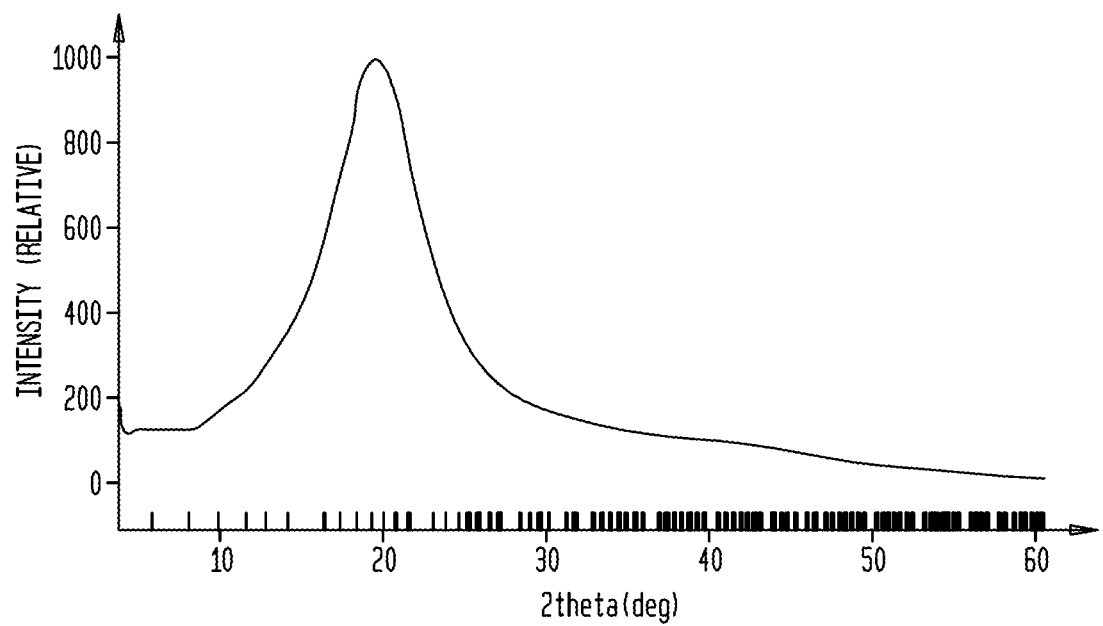

FIGS. 21A-21D show wide-angle X-ray scattering patterns for: (FIG. 21A) PCL-TDI-BU, room temperature; (FIG. 21B) PCL-TDI-BU, T=60° C.; (FIG. 21C) PCL-MDI-BU, room temperature; (FIG. 21D) PCL-MDI-BU, T=60° C. Intensities are arbitrary. FIGS. 21A and 21C show two peaks associated with PCL as expected, and no other Bragg scattering is observed in the wide-angle region. Upon soft segment melting, as shown in FIGS. 21B and 21D, the pattern is dominated by the amorphous PCL halo. No other microstructural features were resolved, suggesting that the poly(bisurea) hard segments did not have sufficient density in the melt to crystallize or that the lamellar spacing of possible crystals could only be resolved through a SAXS experiment.

FIGS. 22A and 22B shows normalized stress retention in 15-min stress relaxation experiments conducted at various temperatures and strains for pristine poly(bisurea) films. FIGS. 23A and 23B show tensile creep experiments for poly(bisurea) films. Temperature was ramped linearly at 1° C. min$^{-1}$. Nominal stress loadings are indicated in the plots. In the creep traces, the melting of the PCL soft segments at $T_m$ is evident from the rapid increase in sample strain by approximately one order of magnitude. In parallel with the $E_r'$ plateaus for temperatures above $T_m$, here, the constant-stress strain exhibits a plateau. Strain then begins increasing rapidly between 120° C. and 140° C., consistent with the increase in the loss tangent signaling an increased rate of chain reptation. FIG. 22 shows normalized stress relaxation curve for linear PCL at 80° C. and various strains.

FIGS. 25A-25F show cold-draw shape-memory of pristine poly(bisurea) films: shape-memory cycles of: (FIG. 25A) PCL-TDI-BU with 200% and (FIG. 25B) PCL-TDI-BU with 400% peak strain, (FIG. 25C) PCL-TDI-BU SM performance metrics; (FIG. 25D) SM curves, PCL-MDI-BU with 200% and (FIG. 25E) 400% peak strain, (FIG. 25F) PCL-MDI-BU SM performance metrics.

Hot-draw stress-strain curves for reprocessed are shown in FIGS. 27A-27B. After training in the first cycle, the sharp stress peak associated with the yielding of the untrained semicrystalline segments disappears, and the stress initially imparted at peak strain decreased by up to a factor of ⅔. Thereafter, stress relaxation before unloading is smaller than that observed in the first cycle, and the unloading and recovery curves trace each other closely, further indicating that weak, elastically non-ideal network crosslinks are destroyed in the first cycle. Strain fixity ratios and shape recovery ratios are shown in FIGS. 5C and 5F. Stress decay in the deformed state resulting from reconfiguration of semicrystalline PCL domains below $T_m$ is much slower than that from recrystallization from a melted state, and so cold-draw fixities were appreciably lower than those obtained from hot-draw experiments. Strain recovery ratios were again excellent, rising to ≥95% after training and increasing again in the third cycle.

Table S2 is reproduced below and shows shape fixity ratios, $R_f$(N), for hot-drawn PCL-TDI-BU poly(bisurea) films. The corresponding cycles are shown in main-text FIG. 4 and FIG. 26A below.

| | Pristine films | | | Reprocessed films | | |
|---|---|---|---|---|---|---|
| Peak strain | Cycle 1 | Cycle 2 | Cycle 3 | Cycle 1 | Cycle 2 | Cycle 3 |
| 25% | 0.957 | 0.932 | — | 0.982 | 0.982 | — |
| 50% | 1.00 | 1.00 | — | 1.00 | 1.00 | 0.998 |
| 100% | 1.00 | 0.991 | — | — | — | — |
| 200% | 1.00 | 1.00 | 1.00 | — | — | — |

Table 26B is reproduced below and shows shape fixity ratios, $R_f$(N), for hot-drawn PCL-MDI-BU poly(bisurea) films. The corresponding cycles are shown in FIG. 4 and FIG. 26B.

| | Pristine films | | | Reprocessed films | | |
|---|---|---|---|---|---|---|
| Peak strain | Cycle 1 | Cycle 2 | Cycle 3 | Cycle 1 | Cycle 2 | Cycle 3 |
| 25% | 0.982 | 0.943 | — | 0.919 | 0.888 | — |
| 50% | 1.00 | 1.00 | — | 0.937 | 0.928 | 0.925 |
| 100% | 1.00 | 1.00 | — | — | — | — |
| 200% | 1.00 | 1.00 | 1.00 | — | — | — |

As seen in FIGS. 27A and 27B shape-memory cycles for reprocessed poly(bisurea) films, peak strains could not exceed 50% due to weakening along fragmentation boundaries in the reprocessed specimens. The weakening was also responsible for the yielding of the PCL-TDI-BU film during initial loading in the 50%-strain trials, which effectively softened the sample and caused a large deviation from the load curve obtained with 25% strain. In contrast, the loading curves of the reprocessed PCL-MDI-BU films are consistent as in the pristine film cycles due to more complete fragment annealing during the reprocessing procedure.

FIGS. 28A-28F shows shape-memory cycling data for pristine poly(bisurea) films pre-trained through stress relaxation at various strains. The peak strain in all cycles was 100%. To account for the effects of creep training, axial force was zeroed in between each cycle by increasing the initial gap, and so the strain basis is different for each cycle; hence, elongation is reported in terms of absolute gap width. In the top-right plot, an asterisk (*) denotes where the RSA G2 force channel failed to respond to zero load and halt post-recrystallization unloading. This resulted in a smaller gap width measured upon re-heating and the reemergence of stress, but because the sample was still under tension after re-heating, the slow final unload still gave an accurate shape recovery ratio.

FIGS. 29A and 29B show shape recovery ratios achieved in hot-draw thermomechanical cycling by pristine (a) PCL-TDI-BU and (b) PCL-MDI-BU films pre-trained through stress relaxation at various strains. All shape-memory cycles were conducted at 100% strain. The untrained pristine film recoveries for 100% strain are reproduced from main-text FIGS. 4c and 4d for comparison.

Table S4 is reproduced below and shows shape-memory performance metrics for pristine, pre-trained PCL-TDI-BU films. The corresponding cycles are shown in the left column of Table 4.

| Cycle number, N | Stress relaxation training condition | | | | | |
|---|---|---|---|---|---|---|
| | ε = 50% | | ε = 100% | | ε = 150% | |
| | $R_f$ (N) | $R_r$ (N) | $R_f$ (N) | $R_r$ (N) | $R_f$ (N) | $R_r$ (N) |
| 1 | 1.00 | 0.890 | 1.00 | 0.922 | 1.00 | 0.941 |
| 2 | 1.00 | 0.946 | 1.00 | 0.955 | 0.998 | 0.964 |
| 3 | 1.00 | 0.969 | 1.00 | 0.966 | 0.999 | 0.969 |

Table S5 is reproduced below and shows shape-memory performance metrics for pristine, pre-trained PCL-MDI-BU films.

| Cycle number, N | Stress relaxation training condition | | | | | |
|---|---|---|---|---|---|---|
| | ε = 50% | | ε = 100% | | ε = 150% | |
| | $R_f$ (N) | $R_r$ (N) | $R_f$ (N) | $R_r$ (N) | $R_f$ (N) | $R_r$ (N) |
| 1 | 1.00 | 0.924 | 0.986 | 0.945 | 1.00 | 0.940 |
| 2 | 0.999 | 0.963 | 0.987 | 0.963 | 0.999 | 0.960 |
| 3 | 0.997 | 0.956 | 0.988 | 0.965 | 0.998 | 0.966 |

Experimental Methods

Materials and synthetic protocol. Shape-memory thermoplastics were synthesized via stoichiometric reaction of a custom diphenylamine-terminated poly(ε-caprolactone) (PCL) prepolymer (Scientific Polymer, 3,180 g mol−1) and diisocyanates MDI (4,4'-methylene diphenyl diisocyanate, Sigma-Aldrich, 98%) or TDI (toluene-2,4-diisocyanate, TCI Chemicals, >98%). Linear PCL (Mn=75,475 g mol−1 nominal, acid endcap) was purchased from PolySciTech. The prepolymer was melted at 65° C. on a glass plate covered with a PTFE-coated aluminum adhesive layer and degassed in a vacuum oven (T=65° C.) for 10 minutes. A stoichiometric amount of diisocyanate was melted and hand-mixed with the prepolymer for 30 seconds. The reaction mixture was then de-gassed for 10 minutes under vacuum. A PTFE spacer was placed around the reaction mixture, and a second, preheated PTFE-coated glass plate was placed on top of the mixture. The film and assembly were cured at 65° C. for three days.

Structural and Thermal Characterization. 1H-NMR spectra were collected using a Brüker 400-MHz spectrometer. ATR-IR spectra were collected using a Bruker Tensor 27 spectrometer. X-ray data were taken on a diffractometer (Rigaku Synergy-S) using Mo Kα radiation (50 kV, 1 mA). Polymer molecular weights were determined using a Dionex system (Ultimate 3000) configured for size exclusion chromatography (SEC)-equipped with an isocratic pump, autosampler, two gel columns (Shodex KF-402.5HQ and KF-404HQ), and refractive index detector (ERC, Model RefractoMax520). Polymer films were dissolved into tetrahydrofuran (THF) and filtered through a 0.45 mm membrane. Molecular weights and polydispersities were calculated by comparison to a calibration curve generated using the PCL standards. Differential scanning calorimetry was conducted using a commercial calorimeter (Q2000, TA Instruments).

Film Reprocessing. Pristine films were cut into mm-sized fragments using a razor blade. Fragments were sandwiched between two PTFE spacers and a mold frame with a 2-×5-cm void. The assembly was sandwiched be-tween two 6×6" stainless steel plates, which were placed in a Melt Press (Carver, Model 5420) set to 180° C. To maintain thermal contact, the plate gap was gradually reduced as fragments melted, and once the material was flattened, the plates were compressed with minimal measured pressure for five minutes. The temperature set-point was then reduced to room temperature, and the reprocessed film was allowed to cool before extraction.

Thermomechanical Characterization. Stress relaxation, DMA, and hot-draw shape-memory experiments were conducted on rectangular film samples with an approximate size of 3 mm×25 mm using a TA Instruments RSA-G2 Solids Analyzer. Cold-draw shape-memory and strain-to-break experiments were conducted on dog-bone film samples (3.380 mm width, 7.620 mm gage length) using a QT/5 MTS tensile testing frame. Step-by-step stress relaxation, shape-memory and strain-to-break procedures are provided as Supplementary Information.

Stress Relaxation. Samples were heated to the experimental temperature and drawn to the desired peak strain at an extension rate ranging from 0.5-5.0 mm s$^{-1}$, depending on the absolute extension required to achieve the target strain. This precaution was taken to minimize overshoot, which was unavoidable even after PID-tuning the RSA G2 device in cases where the target strain could be achieved in less than 100 ms with the nominal extension rate.

Dynamic Mechanical Analysis. All DMA experiments were conducted using an oscillatory frequency of 6.28 rad s$^{-1}$, an oscillation strain of 0.6%, and a linear temperature ramp rate of 1° C. min$^{-1}$. For pristine, un-trained poly (bisurea) films, significant creep was observed at the shape-memory triggering temperature. This resulted in the films being under compression the remainder of the experiments and worsened the feature-to-noise ratio near the flow temperature. To remedy this, the films were conditioned through the following procedure: (1) ramp from 20° C. to 60° C. with oscillation; (2) isothermally extend to a peak load of 1 MPa at 60° C.; (3) isothermal 20-min stress relaxation at 60° C.; (4) cool from 60° C. to 20° C. at 60° C. min$^{-1}$ at constant strain; (5) hold isothermally at 20° C. for 30 minutes to allow for recrystallization; and (6) ramp from 20° C. to 200° C. with oscillation (experimental trace). Steps 2-4 fixed the sample in a deformed state, causing a shape-memory recovery at the triggering temperature during the experimental trace, manifesting in a sharp stiffening peak in storage modulus occurring after the initial drop. The modulus then settled to the tensed plateau value as desired.

Hot-Draw Shape-Memory Cycling. The poly(bisurea) films were heated to 60° C. and analyzed according to the following protocol: (1) isothermal drawing to the targeted peak strain at an extension rate ranging from 0.5-2.0 mm s$^{-1}$ to minimize overshoot as described previously; (2) isothermal 20-min stress relaxation to allow for training and minimize active relaxation in subsequent steps; (3) cooling from 60° C. to 25° C. at 60° C. min$^{-1}$ followed by equilibration to recrystallize, 40 minutes total; (4) isothermal unloading at 0.005 mm s$^{-1}$ only if full stress decay did not occur during Step 3 (if so, proceed immediately to Step 5); (5) temperature ramp from 25° C. to 60° C. at 60° C. min$^{-1}$ for 35 seconds; and (6) isothermal unloading at 0.01 mm s$^{-1}$ to zero stress.

Cold-Draw Shape-Memory Cycling. Thermal control on the open-air MTS device was enabled by a custom polyimide-insulated box retrofitted to the testing stage and allowing a maximum extension of 120 mm. A heating pad controlled with a PID-tuned Cole-Parmer temperature controller was placed upright around the sample, with a K-type thermocouple inserted through the upper opening of the box and positioned as close to the sample as possible. A 12.0-V computer fan powered by a DC power supply was also placed inside the box to convectively drive airflow and speed sample equilibration. The chamber was sealed at all points during experimental trials. Bis-urea films were analyzed using a 50-N load cell according to the following protocol with 0.02 mm s$^{-1}$ used for all extension and unload rates: (1) isothermal drawing to target peak strain at room temperature; (2) isothermal 1-hr stress relaxation at room temperature; (3) isothermal unloading to zero stress at room temperature; (4) temperature ramping from room temperature to 60° C. and equilibration, 10 minutes total; (5) isothermal unloading to zero stress at 60° C. In between each shape-memory cycle, the heating pad was deactivated and the box was opened, and the sample was allowed to cool and recrystallize for 90 minutes in open air with the fan still operative.

Strain-to-Break Experiments. The tensile data reported here are representative of the trials with minimal slippage of the samples. This was achieved through the use of thin samples (75-μm thickness for PCL-MDI-BU and 250-μm thickness for PCL-TDI-BU) and standard serrated MTS grips. Films were analyzed using a 1250-N load cell and drawn at room temperature.

The melting temperature of semicrystalline SMPs can be tuned by transesterification of poly(valerolactone) with poly (caprolactone). Poly(caprolactone) (PCL) and poly(valarolactone) (PVL) are both semicrystalline polymers with different melting temperatures.

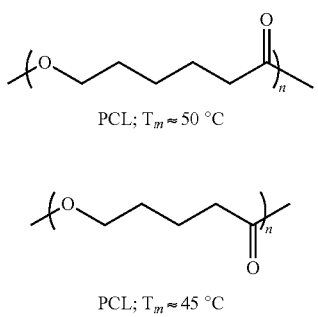

Statistical copolymer PCL-ran-PVL exhibit lower melting temperatures that their pure counterparts, spanning 30-50° C. Random polymerization of prepolymers or sequence rearrangement can be accomplished by transesterification to achieve prepolymers like that shown below for formation of melt-processable SMPs with near-body-temperature triggering. See Yuan et al., ACS Macro Lett. 2020, 9, 588-594.

While preferred embodiments have been shown and described herein, it will be apparent to those skilled in the art that such embodiments are provided by way of example only. Numerous variations, changes, and substitutions will now occur to those skilled in the art without departing from the invention. Various alternatives to the embodiments of the invention described herein may be employed in practicing the invention. It is intended that the following claims define the scope of the invention and that methods and structures within the scope of these claims and their equivalents be covered thereby.

REFERENCES

1. Lee, H.; Yang, J. C.; Thoppey, N.; Anthamatten, M., Semicrystalline Shape-Memory Elastomers: Effects of Molecular Weight, Architecture, and Thermomechanical Path. *Macromolecular Materials and Engineering* 2017, 302 (12).
2. Lewis, C. L.; Meng, Y.; Anthamatten, M., Well-Defined Shape-Memory Networks with High Elastic Energy Capacity. *Macromolecules* 2015, 48 (14), 4918-4926.
3. Shi, Y.; Yoonessi, M.; Weiss, R. A., High Temperature Shape Memory Polymers. *Macromolecules* 2013, 46 (10), 4160-4167.
4. Wu, R. Q.; Lai, J. J.; Pan, Y.; Zheng, Z. H.; Ding, X. B., High-strain slide-ring shape-memory polycaprolactone-based polyurethane. *Soft Matter* 2018, 14 (22), 4558-4568.
5. Yang, P. F.; Zhu, G. M.; Shen, X. L.; Yan, X. G.; Nie, J., Poly(epsilon-caprolactone)-based shape memory polymers crosslinked by polyhedral oligomeric silsesquioxane. *RSC Advances* 2016, 6 (93), 90212-90219.
6. Scheutz, G. M.; Lessard, J. J.; Sims, M. B.; Sumerlin, B. S., Adaptable Crosslinks in Polymeric Materials: Resolving the Intersection of Thermoplastics and Thermosets. *Journal of the American Chemical Society* 2019, 141 (41), 16181-16196.
7. Defize, T.; Riva, R.; Thomassin, J. M.; Alexandre, M.; Van Herck, N.; Du Prez, F.; Jerome, C., Reversible TAD Chemistry as a Convenient Tool for the Design of (Re) processable PCL-Based Shape-Memory Materials. *Macromolecular Rapid Communications* 2017, 38 (1).
8. Pratchayanan, D.; Yang, J. C.; Lewis, C. L.; Thoppey, N.; Anthamatten, M., Thermomechanical insight into the reconfiguration of Diels-Alder networks. *Journal of Rheology* 2017, 61 (6), 1359-1367.
9. Ding, Z. J.; Yuan, L.; Liang, G. Z.; Gu, A. J., Thermally resistant thermadapt shape memory crosslinked polymers based on silyl ether dynamic covalent linkages for self-

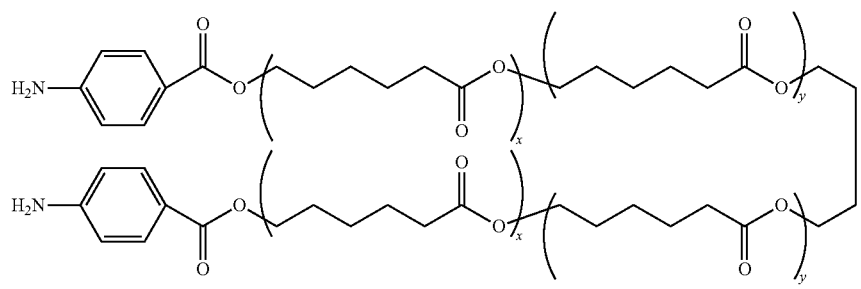

folding and self-deployable smart 3D structures. *Journal of Materials Chemistry A* 2019, 7 (16), 9736-9747.

10. Chen, L. F.; Zhang, L. H.; Griffin, P. J.; Rowan, S. J., Impact of Dynamic Bond Concentration on the Viscoelastic and Mechanical Properties of Dynamic Poly(alkylurea-co-urethane) Networks. *Macromolecular Chemistry and Physics* 2020, 221 (1).

11. Fang, Z. Z.; Zheng, N.; Zhao, Q.; Xie, T., Healable, Reconfigurable, Reprocessable Thermoset Shape Memory Polymer with Highly Tunable Topological Rearrangement Kinetics. *Acs Applied Materials & Interfaces* 2017, 9 (27), 22077-22082.

12. Wang, Y. W.; Pan, Y.; Zheng, Z. H.; Ding, X. B., Reconfigurable and Reprocessable Thermoset Shape Memory Polymer with Synergetic Triple Dynamic Covalent Bonds. *Macromolecular Rapid Communications* 2018, 39 (10).

13. Ying, H. Z.; Zhang, Y. F.; Cheng, J. J., Dynamic urea bond for the design of reversible and self-healing polymers. *Nature Communications* 2014, 5.

14. Fortman, D. J.; Brutman, J. P.; Cramer, C. J.; Hillmyer, M. A.; Dichtel, W. R., Mechanically Activated, Catalyst-Free Polyhydroxyurethane Vitrimers. *Journal of the American Chemical Society* 2015, 137 (44), 14019-14022.

15. Anthamatten, M., Hydrogen Bonding in Supramolecular Polymer Networks: Glasses, Melts, and Elastomers. *Supramolecular Polymer Networks and Gels* 2015, 268, 47-99.

16. Lewis, C. L.; Dell, E. M., A review of shape memory polymers bearing reversible binding groups. *Journal of Polymer Science Part B—Polymer Physics* 2016, 54 (14), 1340-1364.

17. Thompson, C. B.; Korley, L. T. J., 100th Anniversary of Macromolecular Science Viewpoint: Engineering Supramolecular Materials for Responsive Applications—Design and Functionality. *ACS Macro Letters*, submitted 2020.

18. Isare, B.; Pensec, S.; Raynal, M.; Bouteiller, L., Bisurea-based supramolecular polymers: From structure to properties. *Comptes Rendus Chimie* 2016, 19 (1-2), 148-156.

19. Kikkawa, Y.; Kubota, S.; Karatsu, T.; Kitamura, A.; Kanesato, M.; Yagai, S., Two-Dimensional Organization of Mono- and Bisurea Supramolecular Polymers Studied by Scanning Tunneling Microscopy. *Journal of Nanoscience and Nanotechnology* 2010, 10 (2), 803-808.

20. Versteegen, R. M.; Kleppinger, R.; Sijbesma, R. P.; Meijer, E. W., Properties and morphology of segmented copoly(ether urea)s with uniform hard segments. *Macromolecules* 2006, 39 (2), 772-783.

21. Versteegen, R. M.; Sijbesma, R. P.; Meijer, E. W., Synthesis and characterization of segmented copoly(ether urea)s with uniform hard segments. *Macromolecules* 2005, 38 (8), 3176-3184.

22. Wisse, E.; Govaert, L. E.; Meijer, H. E. H.; Meijer, E. W., Unusual tuning of mechanical properties of thermoplastic elastomers using supramolecular fillers. *Macromolecules* 2006, 39 (21), 7425-7432.

23. Wisse, E.; Spiering, A. J. H.; Pfeifer, F.; Portale, G.; Siesler, H. W.; Meijer, E. W., Segmental Orientation in Well-Defined Thermoplastic Elastomers Containing Supramolecular Fillers. *Macromolecules* 2009, 42 (2), 524-530.

24. Botterhuis, N. E.; Karthikeyan, S.; Spiering, A. J. H.; Sijbesma, R. P., Self-Sorting of Guests and Hard Blocks in Bisurea-Based Thermoplastic Elastomers. *Macromolecules* 2010, 43 (2), 745-751.

25. Izuka, A.; Winter, H. H.; Hashimoto, T., Molecular-Weight Dependence of Viscoelasticity of Polycaprolactone Critical Gels. *Macromolecules* 1992, 25 (9), 2422-2428.

26. Jiang, S.; Shi, R. H.; Cheng, H. Y.; Zhang, C.; Zhao, F. Y., Synthesis of polyurea from 1,6-hexanediamine with CO2 through a two-step polymerization. *Green Energy Environ* 2017, 2 (4), 370-376.

27. Yamamoto, T.; Shibayama, M.; Nomura, S., Structure and Properties of Fatigued Segmented Poly(Urethaneurea)S .3. Quantitative-Analyses of Hydrogen-Bond. *Polym J* 1989, 21 (11), 895-903.

28. Heinzmann, C.; Lamparth, I.; Rist, K.; Moszner, N.; Fiore, G. L.; Weder, C., Supramolecular Polymer Networks Made by Solvent-Free Copolymerization of a Liquid 2-Ureido-4[1H]-pyrimidinone Methacrylamide. *Macromolecules* 2015, 48 (22), 8128-8136.

29. Pattamaprom, C.; Wu, C. H.; Chen, P. H.; Huang, Y. L.; Ranganathan, P.; Rwei, S. P.; Chuan, F. S., Solvent-Free One-Shot Synthesis of Thermoplastic Polyurethane Based on Bio-Poly(1,3-propylene succinate) Glycol with Temperature-Sensitive Shape Memory Behavior. *ACS Omega* 2020, 5 (8), 4058-4066.

30. Rabani, G.; Luftmann, H.; Kraft, A., Synthesis and characterization of two shape-memory polymers containing short aramid hard segments and poly(epsilon-caprolactone) soft segments. *Polymer* 2006, 47 (12), 4251-4260.

31. Rabani, G.; Rosair, G. M.; Kraft, A., Low-temperature route to thermoplastic polyamide elastomers. *Journal of Polymer Science Part a—Polymer Chemistry* 2004, 42 (6), 1449-1460.

32. Yang, Y.; Davydovich, D.; Hornat, C. C.; Liu, X. L.; Urban, M. W., Leaf-Inspired Self-Healing Polymers. *Chem* 2018, 4 (8), 1928-1936.

33. Gu, X. Z.; Mather, P. T., Entanglement-based shape memory polyurethanes: Synthesis and characterization. *Polymer* 2012, 53 (25), 5924-5934.

34. Guo, Q. Y.; Bishop, C. J.; Meyer, R. A.; Wilson, D. R.; Olasov, L.; Schlesinger, D. E.; Mather, P. T.; Spicer, J. B.; Elisseeff, J. H.; Green, J. J., Entanglement-Based Thermoplastic Shape Memory Polymeric Particles with Photothermal Actuation for Biomedical Applications. *ACS Applied Materials & Interfaces* 2018, 10 (16), 13333-13341.

35. Petisco-Ferrero, S.; Fernandez, J.; San Martin, M. M. F.; Ibarburu, P. A. S.; Oiz, J. R. S., The relevance of molecular weight in the design of amorphous biodegradable polymers with optimized shape memory effect. *Journal of the Mechanical Behavior of Biomedical Materials* 2016, 61, 541-553.

36. Doi, M., *Soft Matter Physics*. Oxford University Press: 2013.

REFERENCES

1. Chinnappan, A.; Kim, H., Transition metal based ionic liquid (bulk and nanofiber composites) used as catalyst for reduction of aromatic nitro compounds under mild conditions. *Rsc Adv* 2013, 3 (10), 3399-3406.

2. Lyu, J. S.; Lee, J. S.; Han, J., Development of a biodegradable polycaprolactone film incorporated with an antimicrobial agent via an extrusion process. *Sci Rep-Uk* 2019, 9.

3. Jiang, S.; Shi, R. H.; Cheng, H. Y.; Zhang, C.; Zhao, F. Y., Synthesis of polyurea from 1,6-hexanediamine with $CO_2$ through a two-step polymerization. *Green Energy Environ* 2017, 2 (4), 370-376.

4. Yamamoto, T.; Shibayama, M.; Nomura, S., Structure and Properties of Fatigued Segmented Poly(Urethaneurea)S .3. Quantitative-Analyses of Hydrogen-Bond. *Polym J* 1989, 21 (11), 895-903.
5. Keuleers, A.; Desseyn, H. O.; Rousseau, B.; Van Alsenoy, C., Vibrational analysis of urea. *J Phys Chem A* 1999, 103 (24), 4621-4630.
6. Inaloo, I. D.; Majnooni, S., A Fe$_3$O$_4$@SiO$_2$/Schiff Base/Pd Complex as an Efficient Heterogeneous and Recyclable Nanocatalyst for One-Pot Domino Synthesis of Carbamates and Unsymmetrical Ureas. *Eur J Org Chem* 2019, 2019 (37), 6359-6368.
7. Teo, L. S.; Chen, C. Y.; Kuo, J. F., Fourier transform infrared spectroscopy study on effects of temperature on hydrogen bonding in amine-containing polyurethanes and poly(urethane-urea)s. *Macromolecules* 1997, 30 (6), 1793-1799.

The invention claimed is:

1. A method of producing a semicrystalline shape-memory material that (i) is configured to be melt processed or reprocessed while above a processing temperature $T_{MP}$ into a shape that serves as a permanent shape in the shape-memory cycle thereof, and (ii) is configured to be elastically deformed beneath $T_{MP}$ into a temporary shape that can be fixed into a temporary shape by maintaining strain while cooling beneath the shape-memory transition temperature $T_{SM}$ ($T_{SM}<T_{MP}$) and subsequently reverted to the permanent shape by heating above $T_{SM}$, comprising:
    reacting telechelic poly(caprolactone) prepolymers terminated with phenylamine groups with diisocyanates without catalysis; and
    installing bisurea groups along polymer backbones thereof;
    thereby forming one or more thermoplastic poly(caprolactones) with bisurea groups along the polymer backbones.

2. The method of claim 1, in which the method produces at least one thermoplastic poly(caprolactone) with bisurea groups along the polymer backbones having the following structure:

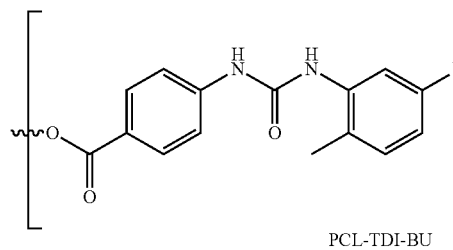 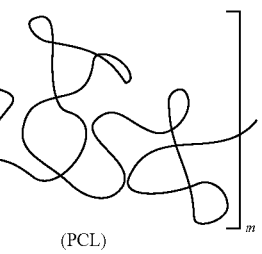

wherein m is at least 1.

3. The method of claim 1 in which the method produces at least one thermoplastic poly(caprolactone) with bisurea groups along the polymer backbones having the following structure

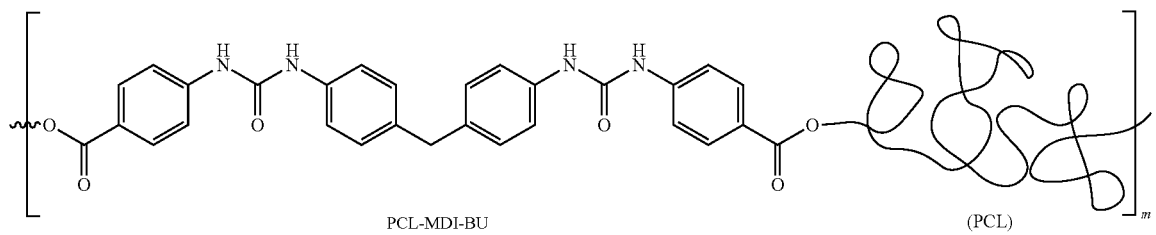

wherein m is at least 1.

4. The method of claim 1, further comprising tuning the melt temperature of said one or more thermoplastic poly(caprolactones) with bisurea groups along the polymer backbones by transesterification.

5. The method of claim 4, in which said transesterification comprises transesterification of poly(valerolactone) with poly(caprolactone).

6. The method of claim 1, in which said one or more thermoplastic poly(caprolactones) with bisurea groups along the polymer backbones after said reprocessing are characterized by shape fixity ratios that are at least 90% of those for the pristine state thereof after three reprocessing cycles at 50% peak strain.

* * * * *